United States Patent
Becker et al.

(10) Patent No.: US 8,472,377 B2
(45) Date of Patent: Jun. 25, 2013

(54) MANAGEMENT OF SESSION CONTROL SIGNALING FOR MULTICAST/BROADCAST SERVICES

(75) Inventors: Ralf Becker, Langen (DE); Osvaldo Gonsa, Langen (DE); Akito Fukui, Kanagawa (JP); Takeshi Kanazawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 419 days.

(21) Appl. No.: 12/680,180

(22) PCT Filed: Mar. 11, 2008

(86) PCT No.: PCT/EP2008/001932
§ 371 (c)(1),
(2), (4) Date: May 21, 2010

(87) PCT Pub. No.: WO2009/043389
PCT Pub. Date: Apr. 9, 2009

(65) Prior Publication Data
US 2010/0265867 A1    Oct. 21, 2010

(30) Foreign Application Priority Data

Oct. 2, 2007 (EP) .................................. 07019366

(51) Int. Cl.
*H04W 4/00* (2006.01)
(52) U.S. Cl.
USPC ............ 370/328; 370/312; 370/338; 370/401
(58) Field of Classification Search
USPC .................................. 370/312, 328, 338, 401
See application file for complete search history.

(56) References Cited

U.S. PATENT DOCUMENTS

2004/0229626 A1    11/2004   Yi
2004/0229629 A1    11/2004   Yi (Continued)

FOREIGN PATENT DOCUMENTS

| CN | 1751458 | 3/2006 |
|---|---|---|
| EP | 1 742 413 | 10/2007 |
| JP | 2006-512875 | 4/2006 |
| WO | 2004/102831 | 11/2004 |

OTHER PUBLICATIONS

European Search Report dated Apr. 17, 2008.

(Continued)

*Primary Examiner* — Hassan Kizou
*Assistant Examiner* — Toan Nguyen
(74) *Attorney, Agent, or Firm* — Dickinson Wright PLLC

(57) ABSTRACT

The invention relates to a method for distributing control signaling for session control of a multicast or broadcast service within a mobile communication network. Furthermore the invention also provides a base station, mobile terminal and communication system to perform the proposed method. In order to reduce the number of signaling connections for the service, the invention proposes to avoid the initial distribution of session control signaling in the entire mobile communications network or service area. Rather than providing service related control signaling connections upon session start, the control signaling connections are set up in response to service requests of the mobile terminals requesting the service. According to one further aspect, the mobile terminals send the service requests based on service announcements available at the mobile terminals, i.e. in contrast to conventional implementations, the mobile terminals do not await a notification of the access network on the availability of the service within the cell.

13 Claims, 16 Drawing Sheets

U.S. PATENT DOCUMENTS

| | | | |
|---|---|---|---|
| 2006/0030342 A1* | 2/2006 | Hwang et al. | 455/466 |
| 2007/0293249 A1* | 12/2007 | Wang | 455/466 |
| 2008/0259843 A1* | 10/2008 | Cai | 370/328 |
| 2008/0287129 A1* | 11/2008 | Somasundaram et al. | 455/436 |

OTHER PUBLICATIONS

Rummler, Robert, et al., "On the Capacity of Different Channel Selection Strategies for Multicast Transmissions in WCDMA," IEEE Transactions on Vehicular Technology, vol. 56 No. 4, Jul. 2007, p. 2180-2193.

ETSI TS 123 246 V7.3.0, "Universal Mobile Telecommunications System; Multimedia Broadcast/Multicast Service; Architecture and functional description," European Telecommunications Standards Institute, Jun. 2007, p. 1-56.

ETSI TS 136 300 V8.2.0, "$3^{rd}$ General Partnership Project; Technical Specification Group Radio Access Network and Evolved Universal Terrestrial Radio Access; Overall Description; Stage 2," 3GPP Organizational Partners, Sep. 2007, p. 1-109.

ETSI TS 136 300 V8.3.0, "Universal Mobile Telecommunications System; Evolved Universal Terrestrial Radio Access and Evolved Universal Terrestrial Radio Access; Overall description; Stage 2," European Telecommunications Standards Institute, Jan. 2008, p. 1-124.

3GPP TS 23.401 V1.2.1, "$3^{rd}$ Generation Partnership Project; Technical Specification Group Services and System Aspects; GRPS enhancements for E-UTRAN access," 3GPP Organizational Partner, Sep. 2007, p. 1-87.

Joint meeting of 3GPP TSG RAN2, RAN3, SA2, R3-070395, "Working Assumptions for MBMS," Vodafone, Feb. 2007, 1 page.

Notice of Reason for Rejection dated Jul. 25, 2012, with English translation.

Foreign Office Action dated Aug. 31, 2012, with English translation.

* cited by examiner

MANAGEMENT OF SESSION CONTROL SIGNALING FOR MULTICAST/BROADCAST SERVICES

FIELD OF THE INVENTION

The invention relates to a method for distributing control signaling for session control of a multicast or broadcast service within a mobile communication network. Furthermore the invention also provides a base station, mobile terminal and communication system to perform the proposed method.

TECHNICAL BACKGROUND

3GPP Long Term Evolution (LTE) & MBMS for LTE

An architecture for Multicast/Broadcast Services (MBMS) is discussed as part of the LTE/SAE standardization within 3GPP (SAE=System Access Evolution). In order to distinguish this evolved service architecture from previous architecture releases it is sometimes also referred to as E-MBMS. Similarly, in order to distinguish from the conventional UMTS Terrestrial Radio Access Network (UTRAN), the LTE network is also referred to as E-UTRAN.

Generally an E-MBMS service might be available in a certain area, which is usually referred to as the MBMS Service Area. This service area might span the entire Public Land Mobile Network (PLMN) of an operator, but might also cover only subset of same, depending on operator's configuration. An example for a PLMN-wide service is news broadcast. In contrast, services like traffic information are typical examples of services that might be only of local interest and therefore appropriate MBMS Service Areas might only cover subsets of the PLMN.

Transmission of E-MBMS in E-UTRAN is either a single-cell transmission or a multi-cell transmission as currently specified in 3GPP TS 36.300, "Evolved Universal Terrestrial Radio Access (E-UTRA) and Evolved Universal Terrestrial Radio Access (E-UTRAN); Overall description; Stage 2", version 8.2.0 (available at http://www.3gpp.org and incorporated herein by reference).

A multi-cell transmission (Multi-cell PTM) supports combining of MBMS transmission from multiple cells. These types of transmissions are also referred to as Single Frequency Network (SFN) transmissions. Multi-cell transmission is available for cells that support the specific SFN requirements, like a strict time synchronization, in order to transmit the same data at exactly the same time and frequency. All cells that fulfill these requirements are part of the so-called MBSFN Area, which will typically cover parts of the MBMS Service Area with high user density, e.g. city centers.

In contrast single cell transmission (Single-cell PTM) is transmitted only on the coverage of a specific cell. It is used outside the MBSFN Area typically experiencing a low user density. Usually this might be the larger part of the MBMS Service Area.

As discussed in 3GPP Tdoc. R3-070395, "Working Assumptions for MBMS" by Vodafone (available at http://www.3gpp.org/ftp/tsg_ran/WG3_lu/TSGR3_55/docs/), E-MBMS services can be provided in one of two modes:

MBMS Broadcast mode—MBMS services are transmitted everywhere within the MBMS Service Area irrespective of UE location or quantity. The UEs do not need to leave RRC Idle state for MBMS reception.

MBMS Enhanced Broadcast mode—MBMS services are not transmitted everywhere and UE location and quantity may be taken into account by the network. The UEs may need to leave RRC Idle state for MBMS reception.

The presently discussed architecture for E-MBMS services may be found in 3GPP TS 23.401, "General Packet Radio Service (GPRS) enhancements for Evolved Universal Terrestrial Radio Access Network (E-UTRAN) access", version 1.2.1 (available at http://www.3gpp.org and incorporated herein by reference) and specifies several logical entities each fulfilling specific functions related to MBMS service provision. There might be several options how these logical entities integrate with the entities specified for the LTE/SAE system. It might even be the case that the entities of the E-MBMS architecture are partly or completely separated from the entities of the LTE/SAE system. An exemplary E-MBMS architecture will be described below with respect to FIG. 1.

On the highest level, as part of the mobile network operator's service network, resides the so-called Broadcast/Multicast Service Centre (BM-SC) which is referred to as the eBM-SC for the E-UTRAN. The eBM-SC constitutes the entry point or source for content provider E-MBMS transmissions. Other main functions of the eBM-SC comprise authorization and control of E-MBMS services, for example sending of Session Start or Session Stop indications. Further it may also provide service announcement information to the interested users. Optionally the eBM-SC may also be part of a service provider's network that is different from the mobile network provider. In such a case there would typically exist some special contract relation between the two providers where the service provider provides the content and the mobile network provider provides the means for distribution of the content.

Mobile communications networks are typically separated on a logical level into a core network (CN) and a radio access network (RAN). The core network hosts common functions like authentication, authorization, and accounting (AAA) while the radio access network provides technology-dependent functions like the air interface.

An entity in the core network responsible for handling E-MBMS services might be called E-MBMS gateway (E-MBMS GW). Its main function is the termination of the interface to the eBM-SC and the distribution of the user plane (U-plane) packets for the E-MBMS service in the mobile communications network. With respect to the above-mentioned SFN transmission mode, this might also include the provision of a protocol allowing synchronized transmission on the air interface by the radio access network (SYNC protocol).

In addition to these U-plane functions, the E-MBMS GW might also comprise control planet (C-plane) functions related to E-MBMS services. For example the E-MBMS GW might handle session control signaling between the core network and the radio network like e.g. Session Start or Session Stop signaling. It should be noted that the E-MBMS GW is a logical entity and the described U-plane and C-plane functionality might be integrated into the same node or it might be separated into different nodes, which are connected by a logical interface. For example, 3GPP TS 23.401 refers to the MBMS 1 and MBMS 2 entity, providing the C-plane and U-plane functions described above, respectively.

Another entity within the core network regarding the E-MBMS architecture might become the entity handling user mobility. With respect to the LTE/SAE architecture this entity is referred to as the mobility management entity (MME). As the name implies, its main functionality is mobility management of the UEs. This is of particular importance as the UEs might be in an IDLE state while receiving E-MBMS services. Mobility of UEs in this state is typically tracked only on a coarser granularity at the CN level compared to the cell-accurate tracking of UEs in ACTIVE state at the Radio Access Network (RAN) level.

As already mentioned before, in order to achieve a SFN transmission mode, the same data has to be sent in multiple cells at exactly the same time and frequency. Allocation of time and frequency resources, which are sometimes called a resource blocks, is the typical functionality of radio resource management (RRM). As for SFN transmission the same RRM allocation has to be used for several cells, this functionality might be performed in a separated logical entity which is referred to as the Multi-cell Coordination Entity (MCE) in the LTE/SAE architecture. Again there might be several options where this entity is physically located. It might be a specialized stand-alone entity, either in the RAN or in the CN. Alternatively, it might also be integrated with another node in the RAN or CN. For example, the MCE might be part of the radio base stations serving the cells. In another example, the MCE might be integrated into the operator's Operation & Maintenance (O&M) platform.

Finally on the lowest level, as part of the radio access network, there are several (radio) base stations provided. In an LTE/SAE system these entities are called eNodeBs (eNB). They comprise C-plane and U-plane functions related to E-MBMS services. The main function regarding the U-plane is of course the transmission of the E-MBMS service data into the cell. For example in an SAE/LTE system, the service data is typically transmitted on a logical channel, like the MBMS Transport Channel (MTCH). Depending on the transmission mode (i.e. single-cell or multi-cell transmission) synchronization and RRM information exchange between the eNode Bs and the MCE may be provided to achieve SFN transmission or the Node Bs may schedule transmissions on their own in case of single-cell transmission. A further function of the eNodeBs is the termination of the U-plane interface towards the network (for example E-MBMS GW). The interface towards the network may utilize unicast or multicast in order to distribute the service data to the eNBs.

Typically the U-plane is controlled and configured by the C-plane functions. Regarding the E-MBMS architecture, the handling of Session Start signaling is one example of C-plane function. In case multicast is utilized, the Session Start signaling might inform the eNode Bs which IP multicast address is used for the service data so they can join the transmission. Other C-plane functions that might be comprised in the base stations are to support E-MBMS service reception at IDLE mode UEs. As already discussed above, IDLE mode UEs are usually not known to the eNode Bs. In order to inform possibly present UEs about the availability of an E-MBMS service, the base station may transmit some kind of notification on the available services on a common logical channel within their service area (radio cell(s)). For example in a SAE/LTE system, this common logical channel is the Multicast Control Channel (MCCH).

In order to avoid unnecessary allocation of radio resources on the air interface an eNode B might try to find out whether there is at least one user present in its cell that is interested in the E-MBMS service. For example in the LTE system the procedure is called counting (or polling).

Although not directly part of the E-MBMS architecture, but of course closely related to it, UEs are provided to finally receive the distributed MBMS service data. Unlike for unicast services, there is no direct signaling between the individual UEs and the eNode Bs controlling the respective cells required. As described above, it may be possible for a UE to receive a MBMS service in an IDLE state.

From the UE point of view, the basic information required in order to receive a MBMS service is typically called a service announcement. The service announcement is used to distribute to users service related parameters, e.g. service identifiers like Temporary Mobile Group Identity (TMGI). With this information the UEs are able to detect notification of the availability of a desired service in their current cells e.g. on MCCH. For example, if a notified service identifier matches with one contained in one of the stored service announcements at the UE, it will read the details of the notification including the configuration of the corresponding radio bearer allowing the UE to receive the service data in the cell.

The service announcements may be obtained by the UE in several ways. Generally, the service announcement information may be provided in a standardized format. For example 3GPP Release 6 defines a MBMS User Service Description for this purpose. One possibility for providing service announcements is that a user is subscribed to some services provided by the mobile operator (either directly or indirectly from some $3^{rd}$ party content provider). In this case the mobile operator would also provide an appropriate service announcement. Another possibility may be that the service announcement information is available from some well-know location, e.g. on a web site. Other options might comprise receiving service announcements via Email or messaging services like SMS (Short Message Service) or MMS (Multimedia Messaging Service). It may also be possible that service announcements are part of the contents of a MBMS service, for example a dedicated announcement channel for other MBMS services.

FIG. 2 shows an exemplary, conventional signaling flow in the network to initiate service provision. When receiving Session Start indication from the eBM-SC 101, the E-MBMS GW 102 provides a Session Start message to all eNode Bs 105-108 in the MBMS Service Area (in the example in FIG. 2, the MBMS Service Area corresponds to the radio cells served by eNode Bs 105-108). The Session Start Message may also be sent to the MCE(s) 103 responsible for MBSFN Area(s) (exemplified by the shaded radio cells controlled by eNode Bs 105 and 106) that are part of the MBMS Service Area.

Assuming for example utilization of IP multicast for distribution of the E-MBMS service data to the eNode Bs, the Session Start message would include required information, e.g. IP multicast address for the service and its TMGI, allowing the receiving eNode Bs to join the E-MBMS service data transmission in the network. The eNode Bs 105, 106 located in the MBSFN Area might join the multicast distribution tree in any case. Further, to joining the multicast distribution tree of the MBMS service, the eNode Bs 105, 106 of the MBSFN Area also allocate/reserve the physical resources for transmission of the MBMS data on the MTCH in their radio cells and indicate the MTCH configuration for the MBMS service to potential recipients in their radio cells by a MBMS notification.

The eNBs 107, 108 outside the MBSFN Area might only join if they host interested users. As discussed above, in order to identify potential interested users the eNode Bs might perform a counting procedure. For example they might send a MBMS Counting Request on the MCCH in their cells. UEs in IDLE state receiving this request might send a MBMS Counting Response to the sending eNode B.

In any case the eNode Bs 105-108 will broadcast a MBMS notification in their radio cells that indicates the MBMS service being available. Accordingly, the mobile terminals, such as for example UE 109 moving into the coverage area of eNode B 108, would only request the service, if a MBMS notification in the radio cell(s) of eNode B 108 indicate that the MBMS service is available, but no downlink resources (MTCH configuration) is indicated in the notification.

It becomes apparent in above example signaling flow that the E-MBMS GW 102 has to distribute Session Start signaling to each eNode B 105-108 in the entire MBMS Service Area. Depending on the size of this area it might comprise many eNode Bs. For example considering E-MBMS services like Mobile TV, the MBMS Service Area might be equal to the entire PLMN of an operator.

Due to the nature of signaling messages, they have to be transmitted in a reliable manner. In order to achieve this, typically a connection-oriented transport protocol is used to convey the messages. For example the LTE/SAE system utilizes the Stream Control Transmission Protocol (SCTP) ensuring reliable, in-sequence transport of signaling messages with congestion control.

Being able to exchange signaling messages between an E-MBMS GW 102 and an eNode B means that there exists an interface between them. As stated above the need to provide Session Start signaling to all eNode Bs 105-108 in the MBMS Service Area may require the E-MBMS GW 102 to terminate a high number of interfaces. Utilizing a connection-oriented transport protocol like SCTP, this means E-MBMS GW 102 may have to terminate a high number of connections, e.g. an SCTP connection to each eNode B in the MBMS Service Area.

The MBMS Service Area might comprise one or more MBSFN Areas, which typically experience a high user density, like in city centers. However, the MBSFN Areas typically cover only a small part of the entire MBMS Service Area. Further, the area outside the MBSFN Areas, which covers the larger part of the MBMS Service Area, usually experience a low density of interested users. Otherwise, the operator would most likely have configured it to be part of a MBSFN Area. In any case the E-MBMS GW 102 has to transmit Session Start signaling also to the eNBs outside the MBSFN Areas, as they are also part of the MBMS Service Area. But as there are most likely only few users present, this may lead to the unnecessary transmission of many Session Start messages to these eNBs. Considering for example E-MBMS service like Mobile TV, the required Session Start messages might further increase with the number of provided TV channels.

"Home Zone"—System Design Concepts for 3GPP LTE

Typically, before deploying a cellular mobile communications network, an operator carefully plans its cellular layout taking into account several parameters like geographical constraints or traffic requirements. Although the deployment may change over time, e.g. adding new cells to increase capacity, it can be considered rather static.

On the one hand, this leads to several benefits for the operator. For example, a quasi-static network typically simplifies maintenance and assures performance of the deployment. On the other hand, such a static approach results in an inflexible system, especially from a subscriber's point of view, as the user's perceived service quality depends on the operator's planning. The operator optimizes the system for the general case, e.g. according to peak or average traffic conditions.

However, this system design may not be flexible enough to react on atypical situations, like the individual situation of the subscriber using the operator's network. As an example, the signal strength received at a user equipment (UE) in a cell may correlate to the perceived service quality. A typical cell radius used in a mobile communications network is in the order of some hundred meters to a few kilometers. Depending on the environment covered by the cell, e.g. buildings or trees, and the UE's location within the cell, the signal strength received at the UE is more or less attenuated. For example at an outdoor location close to the base station emitting the radio signals, received signal strength may be close to 100%. However, for an indoor location the signal strength may easily drop to 50% or less.

To improve the reception conditions especially in local areas with high attenuation (e.g. inside buildings) the operator may deploy a small cell with only a limited range. This type of cells is usually referred to as pico cells. The base stations serving the pico cells are "normal" base stations from a functional point of view, but may have limited capabilities like processing power compared to conventional base stations serving the normal (or macro) cells. A train station may be considered as a typical example for a pico cell deployment. The station may be located inside a building or even underground, but there usually is a high density of subscribers trying to access the mobile communications network.

The deployment of pico cells may increase the flexibility to adapt the cell layout of a mobile communications network to more local demands. On the other hand, similar to deploying macro cells, this is based on planning and estimated or measured traffic conditions and can be considered to be a rather static deployment as well.

Another scenario in which local demands are important is the situation at a subscriber's home. In the past, households typically possessed a fixed telephone line (fixed line) connection in addition to one or more mobile phone subscriptions. The fixed line was used to communicate when being at home, where the mobile subscription was used to communicate while being on the move. Typically the fixed line costs where lower compared to the mobile communication. With the advent of the so-called fixed-mobile convergence (FMC) this separation is more and more vanishing. Mobile subscribers do not own an additional fixed line contract and solely use the mobile communications network, even from their home.

Although technically possible, this changes the demands and requirements towards the mobile communications network. On the one hand, the users may expect to receive a similar service at home as they are used from a fixed line connection, which relates to several aspects spanning from service availability to costs. On the other hand, more and more users will access the mobile communications network, which demands higher capacity of the network.

Regarding the costs, some time ago mobile operators started to offer special tariffs when the subscribers are located at home already. This is realized by applying different charging models based on the current cell used by the subscriber/ UE. Per subscriber a specific cell or set of cells may be registered constituting an individual "home zone". As this is based on macro cells the achieved granularity of the "home zone" is rather coarse.

However, a more critical aspect may be the highly increased number of users per cell trying to access the mobile communications network simultaneously. Depending on the actual environment this may not be possible to be solved with network planning. For example considering an urban living area consisting of many multi-storey apartment buildings, a typical macro cell may contain a huge number of mobile subscribers. This may lead to connectivity problems, if many of them try to access the mobile communications network from their home at similar time.

In order to address this problem, the operator may deploy additional macro cells covering the same area increasing the overall capacity of the mobile communications network locally. Alternatively, the operator may consider deploying several pico cells with the same effect. However, in both options the operator risks inefficient utilization of the offered cell capacities during periods in which only few subscribers are located in the area, which is typically the case during daytime in such a scenario.

Above considerations led to a request for devices that could be used similarly to wireless local area network technology, like a WLAN (Wireless Local Area Network) hotspot, for cellular mobile networks providing limited capabilities and a small cell, just enough to cover a subscriber's home. This is typically referred to as femto or home cell, respectively base station. These devices may be owned and deployed by the individual subscribers and connect to the operator's network via a wired or wireless backhaul connection, e.g. DSL (Digital Subscriber Line). This solution provides a very flexible way to address the specific local needs of each individual subscriber. The operator may benefit from such a deployment, as (home) traffic is offloaded from the macro cells. While the subscribers may benefit from assured cell availability (e.g. good signal strength) and possibly better tariffs.

Techniques for femto cells and related problems are actively discussed in standardization bodies like 3GPP. The issue of restricted access to femto cells is among the most important topics. As mentioned above, the femto cell may be owned by the subscriber and use a subscriber's backhaul connection. Therefore, he may want to control or restrict access to the femto cell, e.g. only the owner and other members of his household. This concept is typically referred to as Closed Subscriber Group (CSG) within 3GPP standardization. Similarly, "CSG cell" may be used as a synonymous for "femto cell". Further, a home base station is usually referred to as Home NodeB (HNB) or Home eNodeB (HeNB) within 3GPP.

MBMS Deployment in CSG Cells

Generally, deployment of MBMS services to CSG cells may encounter similar problems as discussed above with respect to MBMS deployment to non-SFN network areas, in particular with respect to session control signaling. Another potential problem to be considered in the MBMS deployment in CSG cells providing 3GPP access is security. The Home NodeBs are typically not controlled by the network operator of the 3GPP mobile communication system so that their access to the 3GPP core network should be controlled.

Another issue may be inefficient resource utilization for distribution of multicast or broadcast services to user located in CSG cells. At the same time service continuity should be assured in case of CSG cells, also if users move to a CSG cell located outside the actual service area of the MBMS service provided in the macro cells.

SUMMARY OF THE INVENTION

In view of the problems above, it is an object of the invention to suggest a mechanism for distributing session control signaling for a multicast or broadcast service within a mobile communications network that reduces the number of signaling connections. Another object is to design this mechanism to also allow for using it in providing a multicast or broadcast service in femto cells. A even further object of the invention is to suggest an authorization and/or transport type selection mechanism for authorizing Home NodeBs (i.e. user-controlled base station in contrast to operator-controlled base stations) and/or to select an appropriate transport mechanism for delivering the multicast or broadcast service within the femto cells.

At least one of the objects is solved by the subject matter of the independent claims. Advantageous embodiments of the invention are subject matters of the dependent claims.

One aspect of the invention is to initially avoid the distribution of session control signaling in the entire mobile communications network or service area. Rather than providing service related control signaling connections upon session start (e.g. the eBM-SC sending the session start message), the control signaling connections are set up in response to service requests of the mobile terminals requesting the service. According to one further aspect, the mobile terminals send the service requests based on service announcements available at the mobile terminals, i.e. in contrast to conventional implementations, the mobile terminals do not await a notification of the access network on the availability of the service within the cell.

Furthermore, another aspect of the invention is the distribution of session control signaling via a mobility management entity, which allows reducing the number of session control signaling connections that have to be terminated by the hierarchically higher network entities (e.g. the E-MBMS gateway towards the service network comprising the service provider, e.g. eBM-SC). In view of the potential need to provide the multicast or broadcast service within a certain sub-area of the entire service area irrespective of the number of users in this sub-area, it may be optionally foreseen that the session control signaling connections towards the service area parts that do not need to be constantly served are relayed via one or more mobility management entities, while the session control signaling connections towards the network portions in which the service is to be constantly provided are not relayed. Accordingly, depending on the desired availability of the service in different network parts/tracking areas, single-cell transmissions or multi-cell transmission may be used.

Considering the deployment of the multicast or broadcast service in femto cells, another aspect of the invention is that the delivery mechanism used for distribution of a multicast or broadcast service to a home base station (i.e. base stations not controlled by the network operator, such as for example a Home NodeB in 3GPP LTE) is decided depending on the location of the home base station with respect to the service area of the multicast or broadcast service. To decide on the delivery mechanism deciding core network entity may be provided with information on the home base station's location and/or a mobile terminal's (i.e. user's) location with respect to the macro cells in response to a service request of the mobile terminal requesting the service. By choosing the correct delivery mechanism, service continuity may be assured for the mobile terminal if it is moving out of the coverage area of femto cell controlled by the home base station.

According to another aspect, an authorization mechanism is provided to authorize the home base station. This authorization mechanism may be part of the decision on the delivery mechanism. The authorization mechanism may also be based on the before mentioned location information of the home base station or the mobile node attaching to the home base station's femto cell. This location information may be thus used for determining whether or not the home base station is located within the service area of the multicast or broadcast service and whether or not the multicast or broadcast service is to be provided via multicast or broadcast to the home base station.

In one example and to assure session continuity upon movement of the mobile terminal, a dedicated bearer is used to provide the broadcast or multicast service data to the home base station, if the base station is located outside the service area. A multicast or broadcast delivery of the service to the home base station may be foreseen, if the home base station is located inside the service area.

In accordance with these aspects above, one embodiment of the invention provides a method for distributing control signaling for session control of a multicast or broadcast service within a mobile communication network. A base station receives a service request for the multicast or broadcast service from a mobile terminal. The base station is thereby associated to a tracking area (or pool area, which is used as a synonym herein) of the mobile communication network. This service request is used as a trigger for the distribution of control signaling for session control (session control signaling) to at least one base station of the tracking area including the base station receiving the service request. Furthermore, in accordance with a further embodiment of the invention, the service request is transmitted by the mobile terminal based on a session announcement for the multicast or broadcast service available to the mobile terminal.

In one example, the distribution of the control information for session control is triggered by transmitting a service request from the base station receiving the service request to a mobility management entity in the core network of the mobile communication system. In response to this service request from the base station, the mobility management entity registers for the multicast or broadcast service at a gateway connecting the core network of the mobile communication system to a service network in which the source of the multicast or broadcast service is located. This gateway may for example be the MBMS gateway discussed previously herein. The gateway could for example maintain a list of mobility management entities registered at the gateway for the multicast or broadcast service to keep track of the mobility management entities that have registered for a service.

Upon successful registration and the multicast or broadcast service already having been started, the control signaling for session control is transmitted by the gateway via the registered mobility management entity to at least one base station that has received the service request from the mobile terminal. Optionally, in another embodiment, the session control signaling is provided to all base stations in the tracking area to which the base station that has received the service request from the mobile terminal belongs or to all base stations of the tracking areas in which the mobile terminal has registered. Accordingly, in another embodiment of the invention, the service request indicates the at least one tracking area the mobile terminal is registered and the service request transmitted by the base station indicates said at least one tracking area to the mobility management entity.

As already indicated above, the mobile communication network may contain one or more tracking areas in which the multicast or broadcast service is to be provided independent from user request or presence. In another embodiment of the invention, the control signaling for session control is therefore distributed to all base stations in these one or more tracking areas. Advantageously, it may be optionally foreseen to realize SFN transmissions in these one or more tracking areas, e.g. by utilizing multi-cell transmissions as previously outlined herein.

The gateway connecting the core network of the mobile communication system to a service network in which the source of the multicast or broadcast service is located may for example address the control signaling for session control to the respective base stations in the one or more tracking areas in which the multicast or broadcast service is to be provided independent from user request or presence, i.e. the gateway may utilize individual session control signaling connections to the base stations (instead of relaying the session control signaling via an intermediate network entity).

The control signaling for session control of the multicast or broadcast service may (inter alia) comprise for example a session start message. In one further embodiment of the invention, the base station having received the session start message from the mobile terminal may send a join message to an upstream router of the core network to join the multicast distribution tree of the multicast or broadcast service. This join message may be for example transmitted by the base station in response to the reception of a session start message for the multicast or broadcast service.

In addition and e.g. also in response to receiving a session start message for the multicast or broadcast service, the base station may send a notification on a multicast or broadcast service related control channel within its radio cell to indicate the radio resource on the downlink on which the multicast or broadcast service is provided to potential service recipients in its service area, i.e. radio cell(s).

As the mobile terminals may send a service request based on a respective corresponding service announcement, it may happen that service requests are sent for services that have not been started yet, i.e. no session start has been yet performed for the service. If a mobility management entity is registering for a service that has not been started yet the gateway may respond to the registration with a message indicating that the multicast or broadcast service for which the registration has been sent by the mobility management entity has not been started yet. The mobility management entity may further inform the base station from which the service request has been received that the multicast or broadcast service has not been started yet. Alternatively, as in the case described before, the mobility management entity may also inform all base stations in the tracking area to which the base station from which the service request has been received belongs to or to all base stations in all tracking areas the mobile terminal is registered.

The respective base stations receiving this indication of the service not having been started yet, may for example send a notification in their respective service area (radio cell(s)) to indicate that the multicast or broadcast service has not been started yet. This could for example prevent mobile terminals interested in the multicast or broadcast service to send a service registration (although the respective service announcement available to these mobile terminals indicates the service to be available in their present tracking area). This notification by the base station(s) may for example only be provided for a predetermined period of time.

In one further exemplary embodiment, the notification is transmitted on a multicast or broadcast service related broadcast control channel, such as the MCCH in the E-UTRAN.

According to another embodiment, the service request identifies the multicast or broadcast service by means of an identifier, such as for example a TMGI or IP multicast address of the service. Further to this service identifier, the service request may for example comprise an indication of the at least one tracking area the mobile terminal is registered, for example by means of respective tracking area identifiers (TAIs).

Moreover, the service request could optionally also identify the entity sending the request, i.e. the mobile terminal or the base station. In case no tracking area is indicated in the service request, this information may be for example used to resolve the tracking area so as to distribute the session control signaling appropriately therein.

As indicated above, according to an aspect of the invention, the mobile communication system includes femto cells controlled by home base stations. Accordingly, the base station may be a home base station that controls a femto cell to which the mobile terminal is attaching or attached. Furthermore, in one exemplary embodiment, the broadcast and multicast service may have been offered outside the femto cell on the macro cell level to the mobile terminal prior to moving to the femto cell coverage area. Accordingly, the session announcement for the multicast or broadcast service may be available to the mobile terminal by reception via macro cell of the mobile communication system.

In a further exemplary embodiment the home base station receiving the service request transmits a service registration request to a proxy gateway in the core network of the mobile communication system. The proxy gateway transmits a authorization request message to a network element within the core network of the mobile communication system. The network element to which the authorization request is transmitted is responsible for deciding the delivery mechanism of the multicast or broadcast service. In one example, the proxy gateway is a Multicast Home eNodeB Gateway (MH-GW) and the network element is a BM-SC. The proxy gateway transmits the authorization response message indicating the delivery mechanism for the multicast or broadcast service to the home base station, and the indicated delivery mechanism is used for providing the multicast or broadcast service data to the home base station.

In a variation of this embodiment, the authorization response message indicates a shared bearer service to be used for providing the multicast or broadcast service data from the proxy gateway to the home base station, and the proxy gateway is joining the multicast group for the multicast or broadcast service. Furthermore, the proxy gateway starts providing session control signaling to the home base station.

Another embodiment of the invention relates to a base station for use in a mobile communication network. The base station is associated to a tracking area of the mobile communication network and a multicast or broadcast service is provided in the communication network. The base station comprises a receiver for receiving a service request for the multicast or broadcast service from a mobile terminal, and a transmitter for transmitting, in response to the service request of a mobile terminal, a service request triggering the distribution of control signaling for session control to the base station and optionally to further base stations of the tracking area.

Further, in another example, the transmitter transmits the service request to a mobility management entity in the core network of the mobile communication system. Moreover, the receiver is capable of receiving the control signaling for session control from the mobility management entity.

In one embodiment, the control signaling for session control of the multicast or broadcast service comprises a session start message, and the transmitter of the base station is adapted to transmit, in response to receiving a session start message, a join message to an upstream router of the core network to join the multicast distribution tree of the multicast or broadcast service. Moreover, the transmitter of the base station may transmit a notification on a multicast or broadcast service related control channel within its radio cell to indicate the radio resource on the downlink on which multicast or broadcast service is provided to potential service recipients.

In another exemplary embodiment, the base station receives, in response to the service request, an indication on the multicast or broadcast service not having been started yet. In response to this indication the base station's the transmitter may transmit a notification in its radio cell indicating that the multicast or broadcast service has not been started yet.

Another embodiment of the invention provides a mobile terminal for use within a mobile communication network. The mobile terminal comprises a transmitter for transmitting a service request for a multicast or broadcast service to a base station. The mobile terminal is adapted to transmit the service request based on a session announcement for the multicast or broadcast service available to the mobile terminal that is announcing the multicast or broadcast service being available.

In a further embodiment of the invention, the mobile terminal is not transmitting a service request, if a notification being received by a receiver of the mobile terminal indicates that the multicast or broadcast service has not been started yet.

Moreover, according to a further embodiment of the invention, the mobile communication system comprises a base station and/or a mobile terminal according to one of the different embodiments described herein.

The communication may also further comprise a mobility management entity serving the base station, and a gateway connecting the core network of the mobile communication system to a service network in which the source of the multicast or broadcast service is located, and the system may be adapted to perform the steps of the method for distributing control signaling for session control of a multicast or broadcast service within a mobile communication network according to one of the various embodiments described herein.

The invention also provides a computer readable medium which, according to another embodiment, is storing instructions that, when executed by a processor of a base station, cause the base station, being associated to a tracking area of a mobile communication network, to receive a service request for a multicast or broadcast service being provided on the mobile communication network from a mobile terminal, and transmit, in response to the service request of a mobile terminal, a service request triggering the distribution of control signaling for session control to the base station and optionally to further base stations of the tracking area.

A further embodiment of the invention is related to a computer readable medium that is storing instructions that, when executed by a processor of a mobile terminal, cause the mobile terminal to transmit a service request for a multicast or broadcast service to a base station, wherein the instructions cause the mobile terminal to transmit the service request based on a session announcement for the multicast or broadcast service available to the mobile terminal that is announcing the multicast or broadcast service being available. This computer readable medium may optionally further store instructions that, when executed by the processor of the mobile terminal, prohibit the mobile terminal to transmit a service request, if a notification being received the mobile terminal indicates that the multicast or broadcast service has not been started yet.

As indicated above, another aspect of the invention is that the delivery mechanism used for distribution of a multicast or broadcast service to a home base station is decided depending on the location of the home base station with respect to the service area of the multicast or broadcast service.

Accordingly, another embodiment of the invention provides a method for deciding on the delivery mechanism of a multicast or broadcast service to a home base station controlling a femto cell within a mobile communication system. A network element within the core network of the mobile communication system and being responsible for deciding the delivery mechanism of the multicast or broadcast service receives a service identifier of the multicast or broadcast service and location information. Based on the received location information and the service identifier it is further determined whether the home base station is located in the service area of the multicast or broadcast service within the mobile communication system. This determination may be for example performed by the network element alone or in cooperation with further network elements of the mobile communication system. Based on the determination result, a shared bearer service or a dedicated bearer service is selected as the delivery mechanism for providing the service data of the multicast or broadcast service to the home base station.

In a variation of the embodiment, a shared bearer service for providing the multicast or broadcast service data from a proxy gateway in the core network of the mobile communication system to the home base station is used, if the home base station is located in the service area, while a dedicated bearer service for providing the service data of the multicast or broadcast service to the home base station is used, if the home base station is located outside the service area. The term dedicated bearer service should indicate that the mobile terminal is provided with the multicast and broadcast service via dedicated bearers set up for the mobile terminal, while in case of using a shared bearer service for the delivery assumes one bearer for the transmission of the multicast or broadcast service data to the home base station (i.e. one copy of the multicast or broadcast service data is distributed towards the home base station).

In one exemplary embodiment, the location information is an information on the home base station's location and/or information on a mobile terminal's location on the macro cell level.

In a further exemplary embodiment of the invention, the service identifier of the multicast or broadcast service and the location information is received at the network element within the core network in response to a service request for the multicast service by a mobile terminal. In a variation, service identifier of the multicast or broadcast service and the location information is received at the network element within the core network from a proxy gateway or the mobile terminal. Furthermore, the home base station could transmit the location information to the mobile terminal in response to the service request being received at the home base station, if the service identifier of the multicast or broadcast service and the location information is transmitted by the mobile terminal.

In another exemplary embodiment, the network element within the core network might check, if a service configuration of the multicast or broadcast service authorizes service delivery by means of a shared bearer to the home base station. This authorization may simply perform a check, whether the home base station of the femto cell is within the service area or not. However, the authorization may alternatively or additionally check the authorization to provide the service to the femto cell at all (e.g. some services may be exclusively be provided on the macro cell level, the home base station is barred from delivering the multicast or broadcast service as part of the multicast or broadcast service delivery tree, etc.) If the home base station is not authorized, a dedicated bearer service for delivering the multicast or broadcast service data to the home base station may be used, even if the home base station is located in the service area of the multicast or broadcast service.

In a further embodiment, the home base station is connected to the core network of the mobile communication via a secure tunnel to a security gateway of the core network. Data exchanged between core network and home base station are tunneled through the secure tunnel between the home base station and the security gateway In one example, the multicast or broadcast service data is to be provided to the home base station using a shared bearer service. In this example, a proxy gateway located in the core network or access network of the mobile communication system may join the multicast of the multicast or broadcast service data. Hence, in this example, the proxy gateway joins the multicast or broadcast service group on behalf of the home base station, and forwards the multicast or broadcast service data from the proxy gateway to the home base station.

In another embodiment, the location information is information on a mobile terminal's location on the macro cell level. Hence, the home base station's location may need to be resolved from the macro cell level information. Accordingly, when determining whether the home base station is located in the service area of the multicast or broadcast service, first one or more service area identifiers of service areas in which the mobile terminal is located may be identified based on the mobile terminal's location. Next, it may be then determined whether one of the one or more service area identifiers is a service area identifier of the service area of the multicast or broadcast service. If this is the case, the home base station is assumed located in the service area.

In a further embodiment, the mobile communication system comprises the femto cell controlled by home base stations and macro cells controlled by at least one base station, wherein the home base station and the at least one base station controlling the macro cells use the same access technology.

Another embodiment of the invention provides a mobile communication system comprising a home base station, a mobile terminal and a network entity in the core network responsible for deciding the delivery mechanism of a multicast or broadcast service to the home base station, wherein the home base station, the mobile terminal and the network entity are configured to perform the method according one of the different embodiments of the invention outlined herein.

A further embodiment of the invention relates to a proxy gateway for use in a mobile communication system and for providing a multicast proxy function to a home base station. The proxy gateway comprises a transmitter unit for transmitting an authorization request message comprising a service identifier of a multicast or broadcast service and location information to a network element within the core network of the mobile communication system. As mentioned previously, the network element is responsible for deciding the delivery mechanism of the multicast or broadcast service. The proxy gateway further includes a receiver unit for receiving an authorization response message to the authorization request message, wherein the authorization response message indicates, whether a shared bearer service or a dedicated bearer service is to be used for providing service data of the multicast or broadcast service to the home base station. The proxy gateway joins a multicast group of the multicast or broadcast service to receive a multicast of the service data and to forward session control signaling related to the home base station, if a shared bearer service is to be used.

The proxy gateway according to a further embodiment of the invention may receive and forward the service data of the multicast or broadcast service to the home base station.

In one further exemplary embodiment, the proxy gateway transmits the service identifier of the multicast or broadcast service and the location information to the network element within the core network in response to a service request for the multicast service by a mobile terminal. For example, the service request from a mobile terminal may trigger the home base station to request authorization at the proxy gateway which in turn triggers the transmission of the service identifier of the multicast or broadcast service and the location information to the network element within the core network.

In another embodiment of the invention the proxy gateway's receiver unit is adapted to receive the location information from the home base station in response to a service request being received at the home base station from a mobile terminal or at power up of the home base station.

A further embodiment of the invention provides a home base station for use in a mobile communication system. The home base station comprises a transmitter unit for transmitting location information to a proxy gateway within the core network of the mobile communication system, and for transmitting an service registration request message for a multicast or broadcast service to the proxy gateway in response to a corresponding request from a mobile terminal attaching to the femto cell of the home base station. The home base station further comprises a receiver unit for receiving a response to the service registration request message. The response message indicates whether the multicast or broadcast service is to be provided to the mobile terminal via a dedicated service between mobile terminal and the source of the multicast or broadcast service, or whether a shared bearer service is to be used for delivering service data of the multicast or broadcast service to the home base station for further distribution in the femto cell.

In another embodiment of the invention the home base station transmits the location information to the proxy gateway upon request from the proxy gateway, upon connection of the home base station to the mobile communication system, or as part of the service registration request message.

The home base station may further broadcast a service notification for the multicast or broadcast service within the femto cell control by the home base station, if the response to the service registration request message indicates the use of the shared bearer service used for delivering service data of the multicast or broadcast service to the home base station for further distribution in the femto cell.

The home base station according to another embodiment is further capable of rejecting the service request of a mobile terminal for the multicast or broadcast service, if the response to the service registration request message indicates that the multicast or broadcast service is to be provided to the mobile terminal via a dedicated service between mobile terminal and the source of the multicast or broadcast service.

Other embodiments of the invention relate to the mobile terminal attaching to a home base station. According to one embodiment the mobile terminal comprises a transmitter unit for transmitting a service request message for a multicast or broadcast service and for transmitting location information on the mobile terminal's location on the macro cell level to the home base station controlling the femto cell, and a receiver unit to receiving service data of the multicast or broadcast service. The receiver unit of the mobile terminal is adapted to receive the service data according to a service configuration indicated in a service notification broadcast in the femto cell by the home base station in response to the service request message or using a dedicated bearer service between the mobile terminal and the source of the multicast or broadcast service, in case a rejection of the service request is received from the home base station in response to the service request message.

In a further embodiment of the invention, the mobile terminal comprises a transmitter unit for transmitting a service request message for a multicast or broadcast service and for transmitting to the home base station controlling the femto cell, and a receiver unit for receiving in response to the service request message a authorization request message from the home agent triggering the mobile terminal to authorize the home base station. Furthermore, the mobile terminal is capable of transmitting an authorization request message to a network element of the core network of the mobile communication system. The transmitted authorization request message comprises a service identifier of the multicast or broadcast service and location information allowing the network element of the core network to determine whether the home base station is located in the service area of the requested multicast or broadcast service. Moreover, the mobile terminal may receive a response message to the authorization request message, wherein the response message is indicating whether the home base station is authorized to deliver the requested multicast or broadcast service or whether the mobile terminal is to request delivery via a dedicated bearer service at the source of the multicast or broadcast service.

In another embodiment of the invention the mobile terminal's receiver unit is adapted to receive, depending on the a response message to the authorization request message, the service data according to a service configuration indicated in a service notification broadcast in the femto cell by the home base station in response to the service request message or using a dedicated bearer service between the mobile terminal and the source of the multicast or broadcast service, in case a rejection of the service request is received from the home base station in response to the service request message.

Another embodiment of the invention relates to a computer readable medium storing instructions that, when executed by a processor of a proxy gateway, cause the proxy gateway to provide a multicast proxy function to a home base station. The instructions cause the proxy gateway to transmit an authorization request message comprising a service identifier of a multicast or broadcast service and location information to a network element within the core network of the mobile communication system, wherein the network element is responsible for deciding the delivery mechanism of the multicast or broadcast service, and to receive an authorization response message to the authorization request message, wherein the authorization response message indicates, whether a shared bearer service or a dedicated bearer service is to be used for providing service data of the multicast or broadcast service to the home base station. The instructions further cause the proxy gateway to join a multicast group of the multicast or broadcast service to receive a multicast of the service data and to forward session control signaling related to the home base station, if a shared bearer service is to be used.

In a further embodiment, the invention provides a computer readable medium storing instructions that, when executed by a processor of a home base station, cause the home base station to transmit location information to a proxy gateway within the core network of the mobile communication system, transmit an service registration request message for a multicast or broadcast service to the proxy gateway in response to a corresponding request from a mobile terminal attaching to the femto cell of the home base station, and receive a response to the service registration request message, wherein the response message indicates whether the multicast or broadcast service is to be provided to the mobile terminal via a dedicated service between mobile terminal and the source of the multicast or broadcast service, or whether a shared bearer service is to be used for delivering service data of the multicast or broadcast service to the home base station for further distribution in the femto cell.

A further computer readable medium according to another embodiment of the invention is storing instructions that, when executed by a processor of a mobile terminal, cause the mobile terminal to transmit a service request message for a multicast or broadcast service and for transmitting location information on the mobile terminal's location on the macro cell level to the home base station controlling the femto cell, receive service data of the multicast or broadcast service, and receive the service data according to a service configuration indicated in a service notification broadcast in the femto cell by the home base station in response to the service request message or use a dedicated bearer service between the mobile terminal and the source of the multicast or broadcast service, in case a rejection of the service request is received from the home base station in response to the service request message.

Alternatively, in another embodiment the computer readable medium stores instructions that, when executed by the processor of a mobile terminal, cause the mobile terminal to transmit a service request message for a multicast or broadcast service and for transmitting to the home base station controlling the femto cell, receive in response to the service request message a authorization request message from the home agent triggering the mobile terminal to authorize the home base station, and transmit an authorization request message to a network element of the core network of the mobile communication system, wherein the authorization request message comprises a service identifier of the multicast or broadcast service and location information allowing the network element of the core network to determine whether the home base station is located in the service area of the requested multicast or broadcast service. The instructions further cause the mobile terminal to receive a response message to the authorization request message, wherein the response message is indicating whether the home base station is authorized to deliver the requested multicast or broadcast service or whether the mobile terminal is to request delivery via a dedicated bearer service at the source of the multicast or broadcast service.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
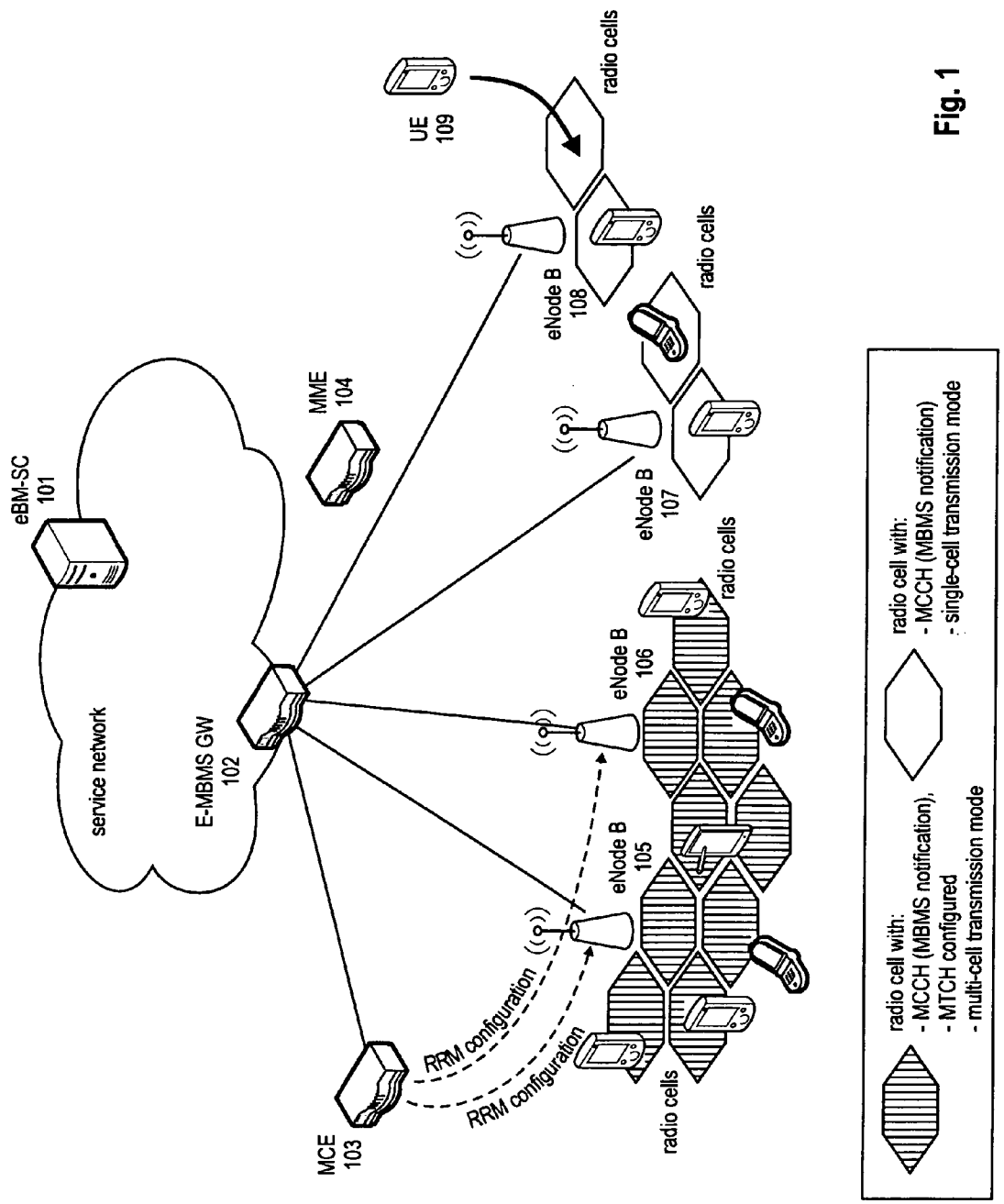
FIG. 1 shows an exemplary E-UTRAN architecture for the implementation of an E-MBMS service.
Figure 2:
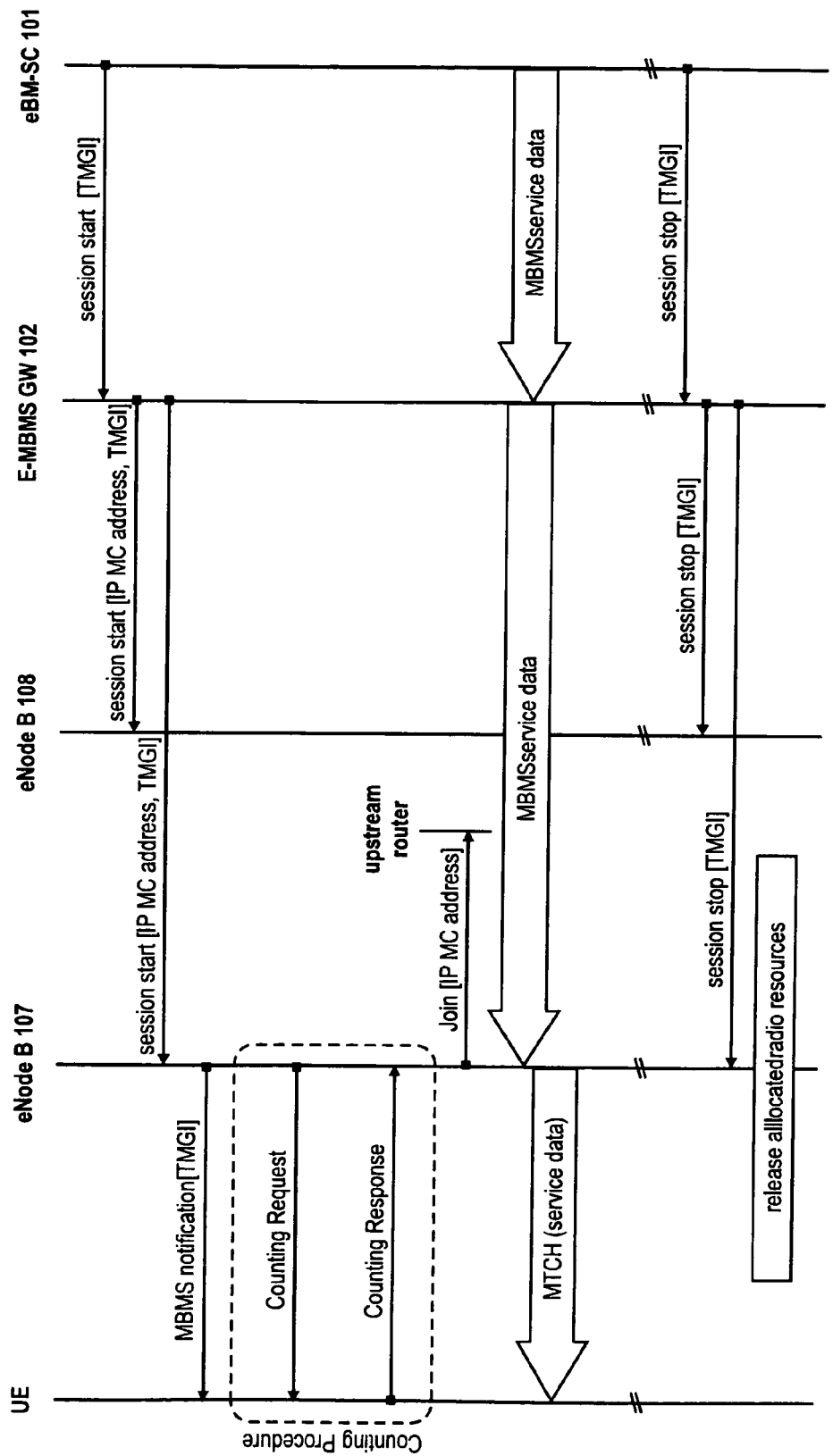
FIG. 2 shows an exemplary session control signaling flow for initiating an E-MBMS service in a mobile communication system.

The following paragraphs will describe various embodiments of the invention. For exemplary purposes only, most of the embodiments are outlined in relation to an (evolved) UMTS communication system according to SAE/LTE discussed in the Technical Background section above. It should be noted that the invention may be advantageously used for example in connection with a mobile communication system such SAE/LTE communication system, but the invention is not limited to its use in this particular exemplary communication network.

The explanations given in the Technical Background section above are intended to better understand the mostly SAE/LTE specific exemplary embodiments described herein and should not be understood as limiting the invention to the described specific implementations of processes and functions in the mobile communication network. Nevertheless, it should be noted the improvements proposed herein may be readily applied in the architecture/system described in the Technological Background section and according to some embodiments of the invention make use of standard and improved procedures of this architecture/system.

As indicated above, one main aspect of the invention is to establish session control signaling for a multicast or broadcast service within (at least a part of) the typically wired network (e.g. RAN and CN) of a mobile communication network upon request of a user for the multicast or broadcast service. Accordingly, the presumption in conventional MBMS and E-MBMS architectures of the mobile terminals only requesting a MBMS service, if the MBMS service is notified to be available in a radio cell may be surrendered, and the mobile terminals may send service requests for a specific multicast or broadcast service based on service announcement information available at the mobile terminals, to their current base station thereby notifying the network about their interest in the service. In response to this request message, the receiving base station may trigger the network to provide session control signaling to the base station receiving the request message or to one or more logical radio access network parts, so-called tracking areas, in which the mobile terminal sending the service request is registered or to which the base station receiving the service request belongs.

The provision of the session control signaling may be for example realized by a base station triggering their respective associated mobility management entity to register for the multicast or broadcast service at a gateway responsible for inter-connecting the mobile communication network with a service network in which the source of the requested multicast or broadcast service is located. When the source of the multicast or broadcast service (e.g. the eBM-SC) has already indicated start of the service, the gateway (e.g. the E-MBMS GW) distributes a session start message to the mobility management entities registered for the service. The mobility management entities further distribute the session start message to the base stations. A mobility management entity may for example distribute the session start message to base stations from which it initially received a trigger, but also other options might be possible, e.g. based on associated Tracking Area (TA) of the base stations or contained base stations in the pool area of the mobility management entity. Furthermore, the gateway may be responsible of assigning a multicast address (e.g. a multicast IP address) to the multicast or broadcast service that is utilized within the core network and radio access network for the distribution of the multicast or broadcast service data.

Regarding the termination of required signaling connections, the gateway interfaces only with registered mobility management entities, while the mobility management entities interface only with base stations of the service area that initially send a trigger or are contained in the same tracking area or pool area of a base station that initially send a trigger. Therefore, the number of required signaling connections towards the base stations in the service area can be distributed across several nodes.

In the following, several exemplary embodiments of the invention are described with respect to an E-UTRAN as an exemplary implementation of a mobile communication system and with respect to an (E-)MBMS service as an example for a multicast or broadcast service. The terms user equipment (UE) and mobile terminal and the terms eNode B and base station are respectively used as synonyms herein.

A service area, also referred to as an MBMS Service Area in the subsequent embodiments, typically consists of a group of eNode Bs spanning a certain geographical area. For example, the MBMS Service Area could span the entire PLMN of a mobile operator. Depending on the expected user distribution the operator may configure one or more MBSFN Areas in order to gain from utilizing SFN radio transmission in these areas. This may be of particular interest for areas with a dense user distribution like city centers as it may be assumed that there are always interested users present in these areas so that it is always required to distribute the MBMS service in such an area. Accordingly, in all embodiments of the invention herein, it is optionally possible that a certain part of the service area is configured to provide the multicast or broadcast service irrespective of the user request or presence, e.g. by means of providing SFN transmission.

Generally, it may be assumed herein that the eNode Bs to distribute a multicast or broadcast service require the reception of session control signaling in order to obtain the necessary parameters for the service distribution. Accordingly, the eNode Bs may be informed on these parameters by means of a Session Start message which may for example inform the eNode Bs on the multicast (IP) address that is utilized in the wired part of the mobile communication network to distribute the service data and a service identifier (e.g. TMGI) that is utilized in the network to identify the respective service.

For an MBSFN Area it may be assumed that a Session Start message is always provided to the eNode Bs contained in the MBSFN Area independent of an active service request from any user. The eNode Bs contained in the MBSFN Area receive a Session Start message, allowing them to join the service distribution in the network between the core network and the eNode Bs (using for example the IP multicast address assigned to the service), and to provide the service on their radio interface into the cell, e.g. on MTCH. Further, these eNode Bs might also provide a notification of the available service on their radio interface into the cell, e.g. on MCCH. A UE located in or moving into such a cell may read the notification information, e.g. on MCCH, and subsequently receive the radio transmission of the MBMS service, e.g. on MTCH.

Figure 3:
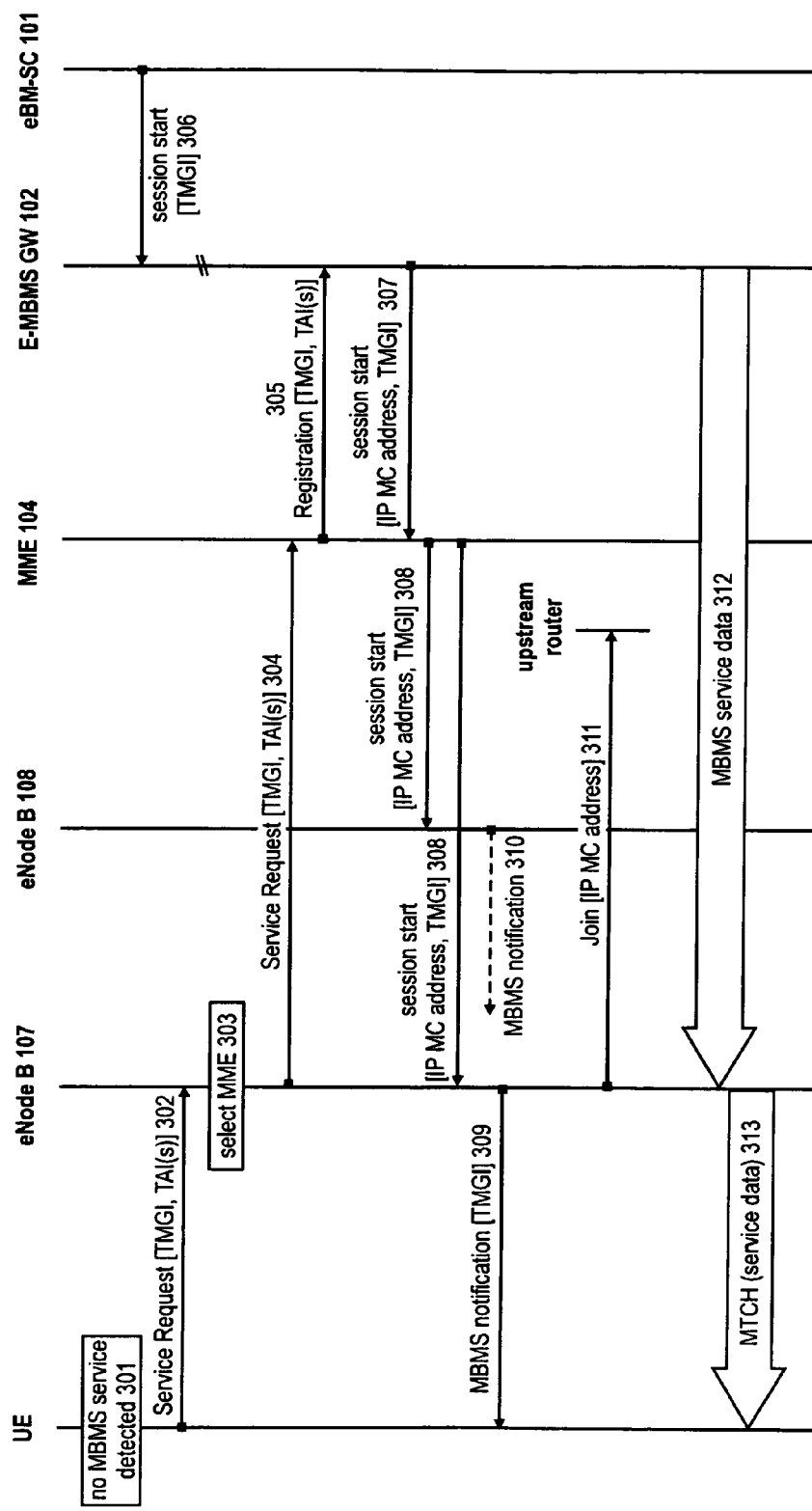
FIG. 3 shows an improved exemplary session control signaling flow for initiating an E-MBMS service in a mobile communication system according to an embodiment of the invention, in which it is assumed for exemplary purposes that the session start for a service has occurred at the time a mobile terminal is requesting the service.

FIG. 3 shows an exemplary signaling flow of a mobile terminal requesting a multicast or broadcast service (MBMS service) and the triggering of the distribution of session control signaling for the service according to an embodiment of the invention. In contrast to the MBSFN Areas discussed above, a MBMS Service Area might also comprise areas with a rather low user density, e.g. rural areas. Depending on the network deployment of the mobile operator and the configuration of the MBMS Service Area, these non-MBSFN Areas might form the larger part of the MBMS Service Area, possibly containing many eNode Bs. As it cannot be assumed that there is at least one interested user per cell, distributing Session Start message to each eNode B outside a MBSFN Area may lead to a lot of unnecessary signaling. Hence, it is assumed that in such areas no Session Start message is distributed without an active service request from a user by default.

A UE is aware about its desired services, for example because it previously subscribed to them or received service announcements advertising interesting services. Having this information, a UE may assume the service to be generally available within the network even if no notification is broadcast in its current cell and may thus try to receive these services. In case the UE is located in a cell (which is not belonging to a MBSFN Area of a particular service i.e. single-cell transmission is to be used), the UE might detect 301 the lack of service notification or radio bearer for this service in the cell.

This may trigger the UE to send 302 a service request, e.g. a MBMS Service Request message, for that service to the eNode B controlling the current cell. This MBMS Service Request may include a service identifier, e.g. TMGI and/or IP Multicast address of the service and optionally the tracking area or tracking areas (e.g. by means of a respective tracking area identifier TAI) to which the UE is registered. When receiving the first service request for a particular service from a UE at eNode B 107, eNode B 107 selects 303 a mobility management entity and sends 304 a service request for the respective service to the selected mobility management entity MME 104.

The MME selection may be for example based on the requested service, e.g. a pre-configured mobility management entity might be handling all MBMS services in the network. This mobility management entity may be also different to the mobility management entity to which the requesting UE is currently attached. The trigger message i.e. the Service Request of eNode B 107 in this example, may identify the requested service by means of TMGI and/or IP Multicast address of the service. Further, the trigger message may optionally contain the tracking area or tracking areas to which the UE is registered. The tracking area(s) of the UE may have been included in the service request from the UE. Alternatively, e.g. in case no tracking area is indicated in the service request from the UE, eNode B 107 may be aware of the tracking area it belongs to and may indicate same in the service request to MME 104 or no tracking area information are included to the service request to MME 104, but MME 104 could derive the tracking area from an identifier of the eNode B in the service request of the eNode B.

MME 104 receiving the trigger (in form of the MBMS service request) from eNode B 107 registers 305 for the service at the E-MBMS GW 102 in order to receive the session control signaling for the requested service, in particular the Session Start message. The registration may for example include a service identifier, TMGI and/or IP Multicast address of the service. Similar to MME 104 being selected by eNode B 107, the E-MBMS GW 102 might be selected by MME 104 based on the MBMS service. Optionally, the E-MBMS GW 102 might be pre-configured in the network.

In the example in FIG. 3, it is assumed for exemplary purposes that E-MBMS GW 102 has already received 306 and indication of service start from the eBM-SC 101, i.e. the session for which MME 104 is sending 305 its registration is already ongoing. Accordingly, E-MBMS GW 102 sends 307 a session start message to MME 104 which identifies the service and also includes a multicast address, e.g an IP multicast (MC) address used for the distribution of the service data (this IP multicast address may be for example selected and configured by E-MBMS GW 102 upon session start).

As indicated above MME 104 may for example derive the tracking area of eNode B 107 from which it originally received 304 the service request for the MBMS service from an eNode B identifier, if no tracking area is indicated therein. Alternatively, the service request message from eNode B 107 may indicate the tracking area of eNode B 107 or the tracking area(s) in which the UE is registered. Accordingly, MME 104 may send 308 a session start to all eNode Bs contained in this/these derived/indicated tracking area(s). In the example in FIG. 3, it may be assumed that eNode Bs 107 and 108 belong to the same tracking area so that MME 104 sends 308 the session start message to these eNode Bs.

The eNode B(s) that are provided with the session start message from MME 104 are informed on the required information to start providing 309, 310 a service notification in their cells (e.g. on a common control channel like the MCCH) and/or the service. At least the eNode B 107 that received the service request from the UE might subsequently join 311 the IP Multicast transmission in the transport network layer (TNL) by sending a join message to an upstream router. Upon having joined the multicast distribution tree of the multicast or broadcast service, all eNode Bs that sent a join message will receive 312 the service data and may provide 313 the service data within their cells, e.g. on the MTCH. Similar to conventional systems, the eNode Bs that receive 308 the session start without having received a corresponding service request from a UE may for example perform a counting procedure (as exemplified in FIG. 1) to decide, whether to already join the multicast distribution of the service, allocate MTCH resources and to start sending the service data in their cells or whether to await a service request from a user before doing so.

As stated above the mobility management entity being triggered by the eNode B receiving the service request from the UE may for example derive the tracking area(s) of the triggering eNode B from the trigger message (including an identifier of the eNode B) and may subsequently send a session start message to all eNode Bs contained in this tracking area(s). Hence, this allows that only one service request for a multicast or broadcast service needs to be sent from a UE per tracking area.

However, depending on the utilized mobility mechanism a UE might be assigned to several tracking areas at the same time. Especially in these situations, it may be advantageous if the UE includes all its assigned tracking areas in the service request to the eNode B (it should be noted that the eNode Bs are not necessarily aware of the UEs in their coverage area, if the UEs are using IDLE mode mobility to move through the network). Further, the eNode B receiving this service request may forward this information to its selected MME, which may then send the session start message to all eNode Bs contained in all tracking areas to which the requesting UE is assigned. This way the number of required service requests from a UE may always be limited to one for the entire ILDE mode mobility area of that UE.

The exemplary embodiments of the invention described above with respect to FIG. 3 have focuses on the distribution of the session start messages (as part of the session control signaling) and the establishment of service provisioning. Typically, session stop is the counterpart for this control message typically also being part of the session control signaling. In case stop of the service is indicated to E-MBMS GW 102 E-MBMS GW 102 will send a session stop message to all the registered MMEs, which will forward this message to all eNode Bs to which they have previously sent a session start message. In response to this session stop message, the receiving eNode Bs may release allocated radio resources for transmission of service data and may no longer indicate the service to be available in the service notification in their cells.

Using the embodiments of the invention described above, sending of service requests from the UE may be limited to one service request per IDLE mode mobility area of the UE, e.g. current tracking area(s). However, crossing the border of the current IDLE mode mobility area, the UE might need to send a service request. Depending on the UE mobility many changes of IDLE mode mobility area may happen. For example considering a UE moving along the border between two tracking areas, it may frequently happen that a cell of the other tracking area than the currently selected provides better signal strength, so the UE will select that cell causing a change of the tracking area (IDLE mode mobility area).

If service availability for all respective UEs should be ensured in all tracking areas the UEs are registered, the procedure described above should be performed for each UE, meaning that all UEs may have to send service requests for the same MBMS service. However, only a single service request at a single eNode B is needed to trigger registration for session start distribution to the entire tracking area. Hence, depending on the actual UE distribution, possibly many service requests are sent unnecessarily.

Furthermore, according to one aspect of the invention as outlined above, a UE may send a service request at any time before an actual service transmission. In this case an indication of session start is not available at the E-MBMS GW 102 yet, which might cause the E-MBMS GW 102 to reject the registration of the triggered mobility management entity.

According to an aspect of the invention, a service request from a UE may be sent based on service announcement information available at the UE. In order to address the problem that UEs may send a service request at any time (before start of a service), the service announcement may include information on start time of the service session. This may subsequently be considered by the UEs in the decision when to send a service request. Of course, it has to be assumed that many UEs, e.g. all UEs interested in the service, receive the same service announcement for a particular multicast or broadcast service. This may result in a situation where many UEs simultaneously send a service request to an eNode B, which may lead to congestion of uplink radio resources. In order to avoid such kind of problems, the service announcement might additionally include parameters to randomize the transmission of service request. For example, the session announcement may comprise a service description (e.g. a MBMS User Service Description) which contains an Initiation Randomization element comprising a parameter for randomizing the time instance at which a respective UE is allowed to send its service request.

However, there might still be some gap between the transmission of a service request by the UE and the actual indication of session start by the service provider, e.g. eBM-SC 101. A possible example when such a situation may arise is when a scheduled service is delayed. A service, e.g. live event, may be scheduled at 7 pm, but actual start of the service might be postponed for 30 minutes. The service announcement may instruct the UEs to send service request shortly before 7 pm (e.g. 10 seconds earlier). Typically the service announcement information is stored in the UEs and may not be possible to be updated in case of changes. Also the network is not aware about the changes, as there is no service context established until an indication of session start is sent from the service provider, eBM-SC 101. Hence, the UEs adhering to outdated service announcement information expect provisioning of the service and therefore may send a service request prior to the session start of the service. Depending on the mobility this might happen frequently, as the service won't be provided at any eNode B, which might result in waste of UE resources like battery power.

In order to avoid above problems, another embodiment of the invention suggests the network utilizing different types of session start indications depending on the time when a service request is sent. This idea is exemplarily outlined in connection with the exemplary signaling flow according to an embodiment of the invention shown in FIG. 4. Before the actual start of the service the network might use a provisional session start in order to achieve notification of other UEs about the service activation of an UE. This provisional session start message may only contain the service identifier, e.g. TMGI, but no other service parameters, as these are not known to the network yet.

Similar to FIG. 3, a UE #1 may detect 301 a service not being available in a radio cell, though its availability may be assumed by the UE #1 based on a corresponding service announcement. UE #1 sends 302 a service request to eNode B 107, which transmits 304 a trigger message to selected MME 104. MME 104 tries to register 305 at E-MBMS GW 102, as described earlier herein.

As no session start for the service for which the registration by MME 104 is transmitted has occurred yet, E-MBMS GW 102 sends 401 a registration reject message indicating the cause of the rejection to MME 104. This reject message does not mean that the E-MBMS GW 102 has not registered MME 104 for the service but merely indicates the session start not having occurred yet. MME 104 distributes 402 a provisional session start to the eNode Bs of the tracking area of requesting eNode B, when its registration at the gateway (e.g. E-MBMS GW 102) is rejected by means of a reject message, because the service is not started yet.

All eNode Bs receiving the provisional session start message (including eNode B 107) start providing 403 a provisional MBMS notification (e.g. by means of respective signaling information on the MCCH) within their cells. The UEs (e.g. UE #1 and UE #2) receiving this provisional MBMS notification (including a service identifier, e.g. TMGI) know that service provision has been already requested and may thus refrain from sending additional service requests. E.g. UE #2 is not sending a service request. This way, only a single UE (UE #1) has to send a service request in the entire tracking area.

When actual start of service is indicated 306 by eBM-SC 101, the network distributes 307, 308 a session start message containing all required information for providing the service to the eNode Bs as described earlier. Similarly, all eNode Bs that receive the session start may decide whether or not to join 311 the multicast distribution tree of the service and whether to notify 309 and provide 312,313 the service to their cells. Compared to the provisional session start, the "normal" session start message will additionally contain necessary service parameters and information required information for establishment of the (MBMS) bearer in the network, e.g. IP Multicast address used for distributing the service data in the network between the E-MBMS GW 102 and the eNode Bs.

Similar to the case described above, a session stop of the service may be indicated from eBM-SC 101 to the E-MBMS GW 102, which will distribute a session stop message to all the registered MMEs, which in turn forward this message to all eNode Bs they previously sent a session start message. In case the eNode Bs received only a provisional session start message, they will release possibly allocated radio resources for transmission of provisional service notification. All eNode Bs that received a session start message may release possibly allocated radio resources for transmission of service data and service notification in their cells.

Figure 4:
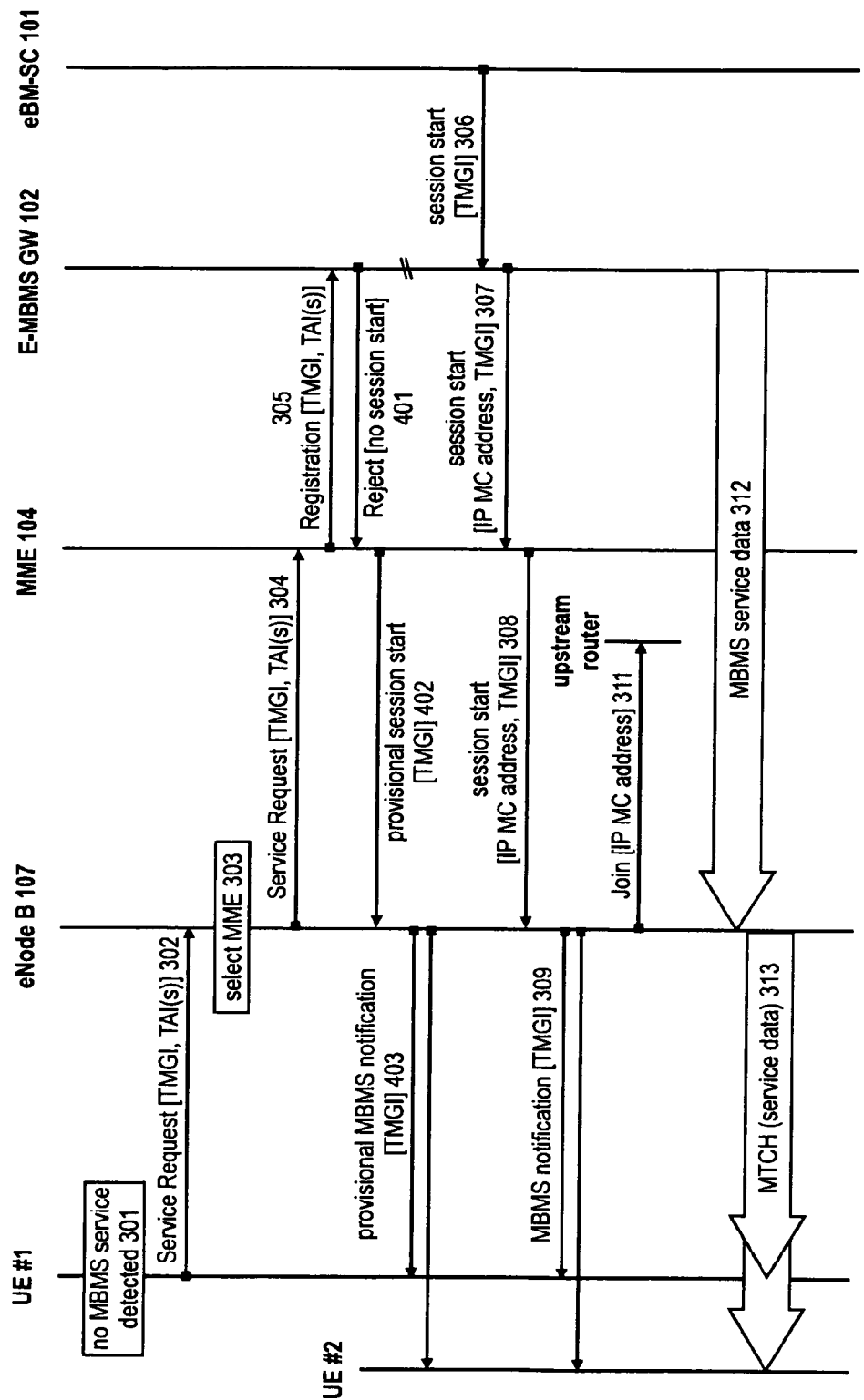
FIGS. 4 & 5 show improved exemplary session control signaling flows for initiating an E-MBMS service in a mobile communication system according to different embodiments of the invention, in which it is assumed for exemplary purposes that the session start for a service has not occurred at the time a mobile terminal is requesting the service, FIG. 6 exemplarily shows an exemplary architecture of a 3GPP LTE/SAE mobile communication system for providing an MBMS service according to an exemplary embodiment of the invention taking into account the deployment of home base stations, FIG. 7 exemplarily shows an exemplary architecture of a 3GPP LTE/SAE mobile communication system for providing an MBMS service according to an exemplary embodiment of the invention taking into account the deployment of home base stations and a separation of security layer and multicast layer.

In the example described with respect to FIG. 4 above, the UEs may send a service request at any time prior to the actual start of the service. Until the time of session start the UEs might have moved to a different location within the network belonging to a different tracking area. Depending on the mobility of the UEs, this might be a completely different location compared to the one from which they initially sent the service request. The embodiments related to FIG. 4 above relate to the problem of limiting the required signaling from the UE in these situations in order to save UE resources. Another problem that may result from UE mobility is concerned with the resource in the network.

For example it is considered that a UE sends a service request for a particular multicast or broadcast service to its current eNode B. If the service is not started yet, this might result in the transmission of a provisional session start in all cells of the current tracking area. However, it may happen that the UE sending the service request moves out of this tracking area. It may further happen, that also no other UE interested in this service is present. Hence, the network unnecessarily provides a provisional MBMS notification in the cells and it will unnecessarily provide the service once it is started, e.g. by the eBM-SC 101.

The UE that moved into the next tracking area will again send a service request, as it is assumed that the mobility happens prior to service start. Consequently, depending on the time before the actual service start and UE mobility, there may be many registered tracking areas that actually do not contain any interested UEs, resulting in unnecessary signaling in the network and unnecessary allocation of network and radio resources.

In order to avoid this kind of problem, according to another exemplary embodiment of the invention, the network bases the provisional service notification on a timer, e.g. in the mobility management entity. This solution is exemplified in the signaling flow of FIG. 5. Similar to FIG. 4, UE #1 sends a service request for a service for which no session start has been performed. Accordingly, this leads to the MME 104's registration (see step 306) to be "rejected" 401 by E-MBMS GW 102. MME 104 may for example start 501 a timer upon sending 402 the provisional session start message to the eNode Bs after receiving a reject message from the E-MBMS GW 102. When the timer expires 502, MME 104 sends 503 a stop provisional notification to all eNode Bs to which it previously sent a the provisional session start message. The receiving eNode Bs will stop their provisional MBMS service notification and may optionally free associated resources.

Alternatively to starting the timer in the mobility management entity, MME 104 may also distribute a timer value in the provisional session start message to the eNode Bs, which run a timer themselves. Upon expiry of the timer at the eNode Bs, the eNode Bs stop providing the provisional MBMS service notification, so that a stop provisional notification message (see 503) from MME 104 is not required in this alternative implementation.

Generally, if the timer expires (in the MME or in the eNode Bs) and transmission 403 of the provisional MBMS service notification is stopped by the eNode Bs, the following situations may occur. In one scenario, there are still UEs present in the tracking area that are interested in the service. In this case, these UEs will detect the lack of provisional MBMS service notification and may therefore send or re-send a service request, which may be again triggering a provisional MBMS service notification and eventually provision of the multicast or broadcast service may be started.

In another scenario, there may be no further UEs present in the respective cells of the tracking area that are interested in the service. In this case no UE will send a service request, so MME 104 is aware that the service distribution in this particular area is not required. Accordingly, when session start is triggered by eBM-SC 101, MME 104 will only be distribute the session control signaling to tracking areas actually containing interested UEs. Optionally, if MME 104 receives no further service requests it may also deregister itself form E-MBMS GW 102.

Figure 5:
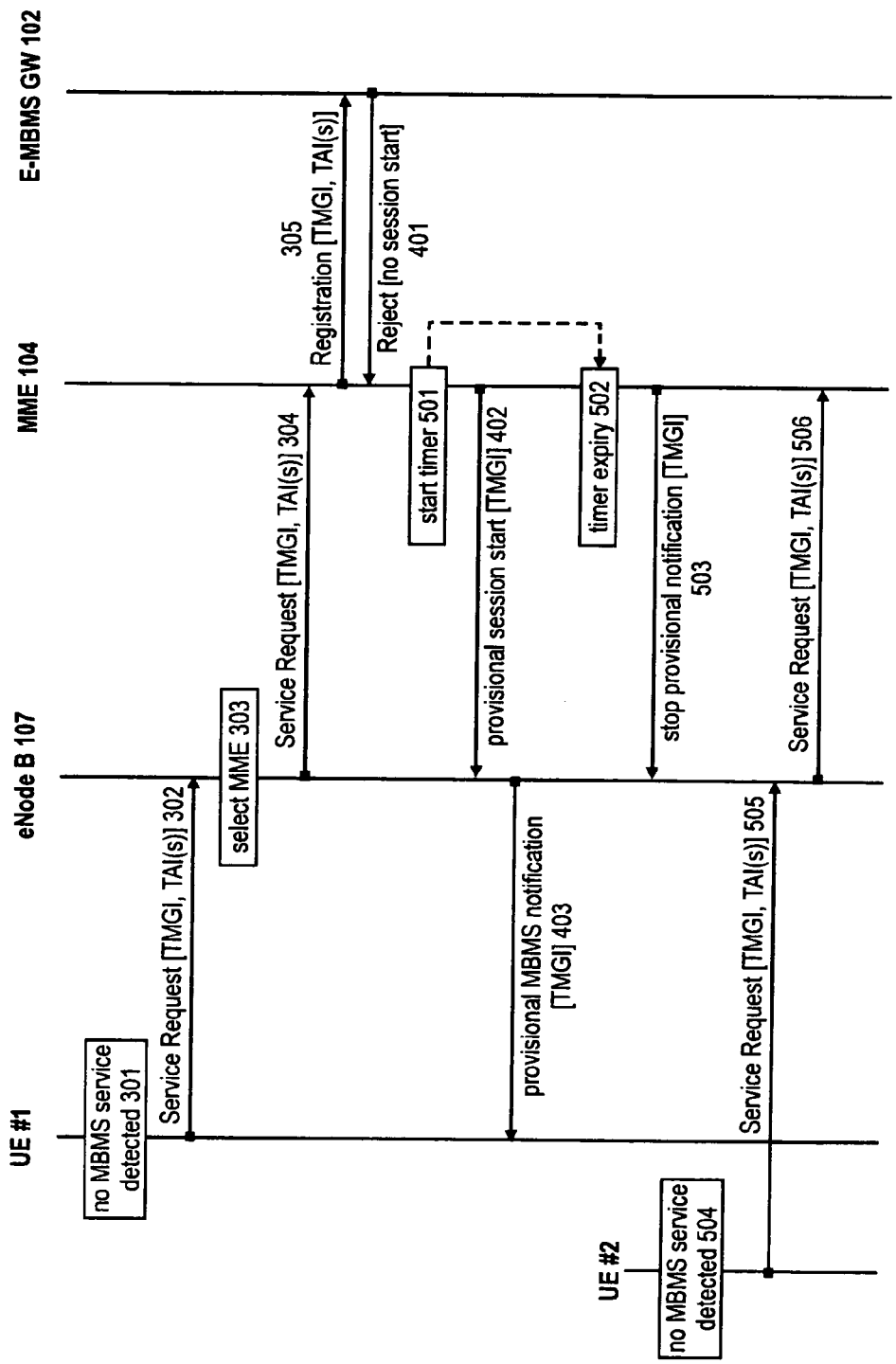

In the exemplary signaling flow of FIG. 5, it is considered that the timer maintained in MME 104 is expiring so that a stop provisional notification indication is sent 503 to the eNode Bs, including eNode B 107, that previously received a provisional session start message, causing the eNode Bs to stop the provisional MBMS service notification. As the provisional MBMS service notification is stopped, UE #2, might detect 504 the lack of a service notification (provisional or non-provisional) and may therefore send 505 a service request for the service. Similar to the situation in FIG. 3 and FIG. 4 (see steps 301 to 305) this may again lead to MME 104 registering for the service at E-MBMS GW 102, and the subsequent steps following the registration at the E-MBMS GW 102 will depend on whether the requested service is started or not.

The procedures and mechanisms described above have been also targeted to optimize distribution of session start messages in the network and to limit required signaling from the UEs and exemplarily assuming that the transmission of the service is not required in the entire service area. However, for some services it may be necessary to distribute the session control signaling, including session start, to all eNode Bs in the entire MBMS service area. For example emergency services may need to be provided to the entire MBMS Service Area with smallest possible delay.

According to another embodiment of the invention, the network may decide whether a particular service needs to be distributed by default to the entire service area or not. According to this decision, it may be further decided how to handle the distribution of session control signaling, i.e. whether to provide the session control signaling to all eNode Bs in the entire service area or whether to utilize a distribution scheme for the session control signaling based on UE service requests, as described above. Furthermore, the network entities and UEs should be informed on the handling of the session control signaling distribution, i.e. whether session start optimization as discussed herein is utilized or not.

One possible option to decide on the utilization of the optimized procedure discussed herein is to make the decision based on service configuration, i.e. depending on the service parameters or service type.

Typically the MBMS services are configured at the eBM-SC 101 being the source of the service in the mobile communications network. It provides the service announcement information to the UEs and also indicates start of a service session to the network.

As described above, the UE behavior, i.e. sending of service request, may be based on service announcement information. For example the session start time announced in the service announcement may be taken into account by the UE in its decision when to send a service request. In a further embodiment, the service announcement information may additionally indicate to the UEs whether an optimized session control signaling distribution is utilized or not. For example, for services that require distribution of session start to the entire service area, the service announcement indicates that optimization is not used. Hence, in this case UEs may send service requests only when receiving a MBMS Notification in a cell where no MBMS radio bearer is provided.

In order to inform the network on the use of an optimized session control signaling distribution, the session start message sent by the eBM-SC 101 may for example carry a flag indicating the desired session control signaling handling to E-MBMS GW 102. Another option could be that the session start message contains an identifier, e.g. of the service or the service type that correlates to a desired handling. In any case, E-MBMS GW 102 may decide based on the information comprised in the session start message how to handle session control signaling distribution. For example, if E-MBMS GW 102 decides not to utilize optimized session control signaling distribution, E-MBMS GW 102 may for example distribute session start messages to all eNode Bs in the entire service area.

In the following, focus will be given on another aspect of the invention, namely the deployment of the multicast or broadcast service in femto cells controlled by a home base station. In general, the term home base station in contrast to the term base station may be understood as to relate to a base station that is not controlled by the network operator. Nevertheless, the home base station provides the same access technology as "normal" base stations that are controlled by the network operator of the mobile communication system. An example for a home base station is a Home NodeB (or HeNB) when considering a 3GPP SAE/LTE system.

Figure 6:
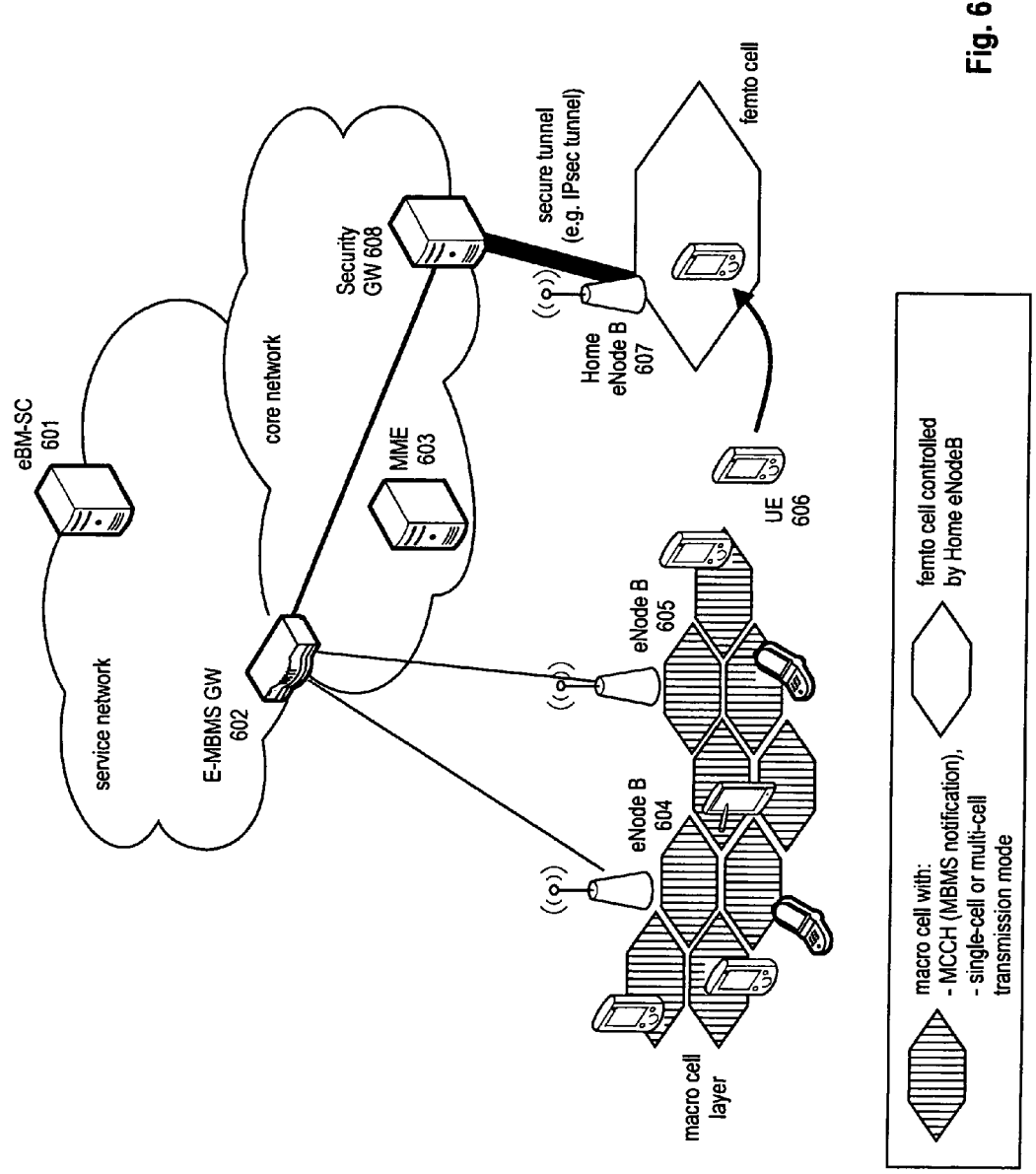

FIG. 6 exemplarily shows an exemplary architecture of a 3GPP SAE/LTE mobile communication system for providing an MBMS service taking into account the deployment of HeNBs at the homes of several subscribers. In this example, the eBM-SC 601 (Evolved Broadcast/Multicast Service Centre) is the source of the service and the related session control signaling, e.g. session start message. The control signaling is provided to the functional or logical entities handling MBMS session control inside the core network (CN) for further distribution according to the MBMS service area. With respect to the standardization of SAE/LTE system in 3GPP, the core network is also referred to as Evolved Packet Core (EPC).

There are several options how functions, like control plane and user plane functions, responsible for handling multicast or broadcast services are arranged in the core network. One possibility is to combine these functions in a dedicated entity, which is typically called E-MBMS GW 602 in the context of 3GPP standardization.

Another possibility is to combine specific subsets of MBMS functions depending on certain requirements in separate entities (not shown in FIG. 6). For example this combination may be based on the type of function, e.g. control plane only or user plane only, or may be based on other conditions like scalability requirements. Accordingly E-MBMS GW 602 may also be realized by providing two functional entities that are commonly referred to as MBMS1 and MBMS2. The MBMS2 entity may for example comprises control plane and user plane functionalities for MBMS and may terminate the interfaces to the eBM-SC 601. The MBMS1 entity may comprise control plane functions only and may be used to allow scalability of the MBMS control plane, e.g. to scale according to the size of the PLMN (Public Land Mobile Network) or service area.

In general, entities like E-MBMS GW or MBMS1 and MBMS2 entities, or the MBMS functions as such, may also be integrated with different logical or functional elements of the mobile communications network, e.g. with the ones of the unicast architecture.

E-MBMS GW 602 may distribute the session control signaling like the session start message to the eNode Bs (or eNBs) 604, 605 located in the MBMS service area. For this purpose, MBMS GW 602 may utilize existing (control plane) interfaces towards the eNodeBs 604, 605. Similar to the eNodeBs 604, 605, MBMS GW 602 may also distribute the session control signaling to administered Home eNodeBs (or HeNBs), i.e. Home eNodeBs to which it maintains an (control plane) interface (not shown in FIG. 6). However, this interface may be different to the one for "normal" eNodeBs 604, 605, e.g. due to the different transport network conditions between MBMS GW 602 and a "normal" eNodeB compared to those between MBMS GW 602 and a Home eNodeB.

As the operator carefully plans the deployment of an eNodeB, it can be assumed that also the transport network is considered in the planning. For example the operator assures that it fulfils sufficient reliability and security requirements.

In contrast thereto, subscribers deploy the Home eNodeBs, which is typically not planned by the operator. As outlined previously, also the backhaul connection from the Home eNodeB to the operator's core network may not be under the control of the operator. An Internet access provided by an Internet service provider (ISP), e.g. via a Digital Subscriber Line (DSL), is as a typical example of a backhaul connection. Especially the operator's security requirements may not be met in such a scenario.

The operator of a mobile communication system may thus require a secure communication link between the Home eNodeB and the operator's core network. As shown in FIG. 6, this can be for example achieved by deploying a security gateway (Security GW 608) in the operator's mobile communications network establishing a secure communication tunnel towards the Home eNodeB 607, e.g. using IPsec (see Kent et al., "Security Architecture for the Internet Protocol", IETF RFC 4301, available at http://www.ietf.org and incorporated herein by reference). All traffic between Home eNodeB 607 and the core network is conveyed through this tunnel, which protects the communicated data from eavesdropping and alteration during the transmission.

Similar to the consideration regarding arrangement of the MBMS functions, Security GW 608 may exist as a dedicated entity but may also be integrated with existing entities in the mobile communications network. In the example architecture depicted in FIG. 6 it is shown as a dedicated entity in the operator's core network. However, it may also be deployed as an entity of the radio access network (RAN), i.e. similar to the (macro) eNodeBs 604, 605.

As pointed out before, the interface between E-MBMS GW 602 and an eNodeB is different to the one between E-MBMS GW 602 and a Home eNodeB. This is mainly because the utilization of a secure tunnel between the core network and the Home eNodeB, which results in connection with similar capabilities compared to those of a point-to-point link. The impacts regarding the MBMS control plane should be minor, because the exchange of control signaling is mainly following a point-to-point communication paradigm.

To the contrary, the impacts on the MBMS user plane may be severe, because the MBMS user plane is following a point-to-multipoint communication paradigm, for example using IP multicast for transport.

Mapping a multicast transmission onto several point-to-point connections typically results in inefficient resource utilization in the transport network, as multiple copies of the same data packet have to be transmitted on the individual connections. In case the connections share a (partly) common path in the transport network, this unnecessarily increases consumed transport resources compared to forwarding only a single packet.

In order to utilize resource-efficient IP multicast transmission, the session start message may include an IP multicast group address to which MBMS data packets are sent. Receiving base stations (eNodeBs) may join this IP multicast group to receive the packets. The group management, e.g. joining or leaving the multicast group, may for example be based on the Internet Group Management Protocol (IGMP) as for example specified in Cain et al., "Internet Group Management Protocol, Version 3", IETF RFC 3376 (available at http://www.ietf.org and incorporated herein by reference) or Multicast Listener Discovery (MLD) communications protocol as for example specified in Vida et al., "Multicast Listener Discovery Version 2 (MLDv2) for IPv6", IETF RFC 3810 (available at http://www.ietf.org and incorporated herein by reference) that are included by default within the IPv4 or IPv6 protocol (see Information Sciences Institute, University of Southern California, "Internet Protocol; Darpa Internet Program; Protocol Specification", IETF RFC 791, and Deering et al., "Internet Protocol, Version 6 (IPv6); Specification", IETF RFC 2460 both documents available at http://www.ieff.org and incorporated herein by reference).

Regarding the deployment of home base stations, this would require the security gateway (e.g. Security GW 608) to support IP multicast capabilities. Usually IP-in-IP encapsulation together with encryption is used to establish a secure tunnel between two endpoints like for example the Home eNodeB 607 and Security GW 608. IP datagrams sent by one tunnel endpoint are encapsulated and transmitted to the other tunnel endpoint where they are de-capsulated again. From the endpoints' position, transmission is similar to a direct point-to-point link between the two entities.

This also impacts IP multicast transmission. On the one hand, a security gateway (e.g. Security GW 608) would need to support handling of a group management protocol, like IGMP or MLD. For example, the home base stations (e.g. Home eNodeB 607) receiving a (MBMS) session start message that contains an IP multicast group address send a respective IGMP or MLD message to join the group. This message is tunneled to Security GW 608, which would—on the one hand—need to join the indicated multicast group itself. On the other hand, Security GW 608 is required to route incoming IP multicast packets to the appropriate home base stations (e.g. Home eNodeB 607). This involves management of joined multicast groups per home base station and copying incoming IP multicast packets to the appropriate tunnels. Usually this functionality are typically not supported by protocols for establishing a secure tunnel, like IPsec—although, several extension have been proposed to add IP multicast support. From a general perspective adding multicast support to security related protocols results in the security layer being dependent on the multicast layer. However, network operators of mobile communications networks may not want this kind of dependency and may ask for an architecture offering a security layer being independent from the multicast layer.

Besides the impacted requirements of Security GW 608, support of IP multicast to home base stations may also impact the MBMS functions in the core network. For example the MBMS control plane functions, e.g. comprised in E-MBMS GW 602, need to be aware of home base stations for distribution of session control messages. This may further require a mapping of home base stations to service areas in order to decide to which home base station to send session control signaling. Additionally maintenance of appropriate interfaces towards the home base stations is desirable to allow the distribution of session control signaling. An operator of mobile communications network may dislike this dependency of network configuration and home base stations' deployment being typically uncontrolled by the operator. Subscribers may at any time deploy or remove home base stations or easily alter their geographical location, e.g. moving it to a friend's house. So in general correlation of home base station's location with a tracking area (TA) on the macro cell layer or MBMS service area may not depend on operator deployment and planning. Hence, an operator may prefer to keep the rather static network configuration independent of home base station impacts.

Figure 7:
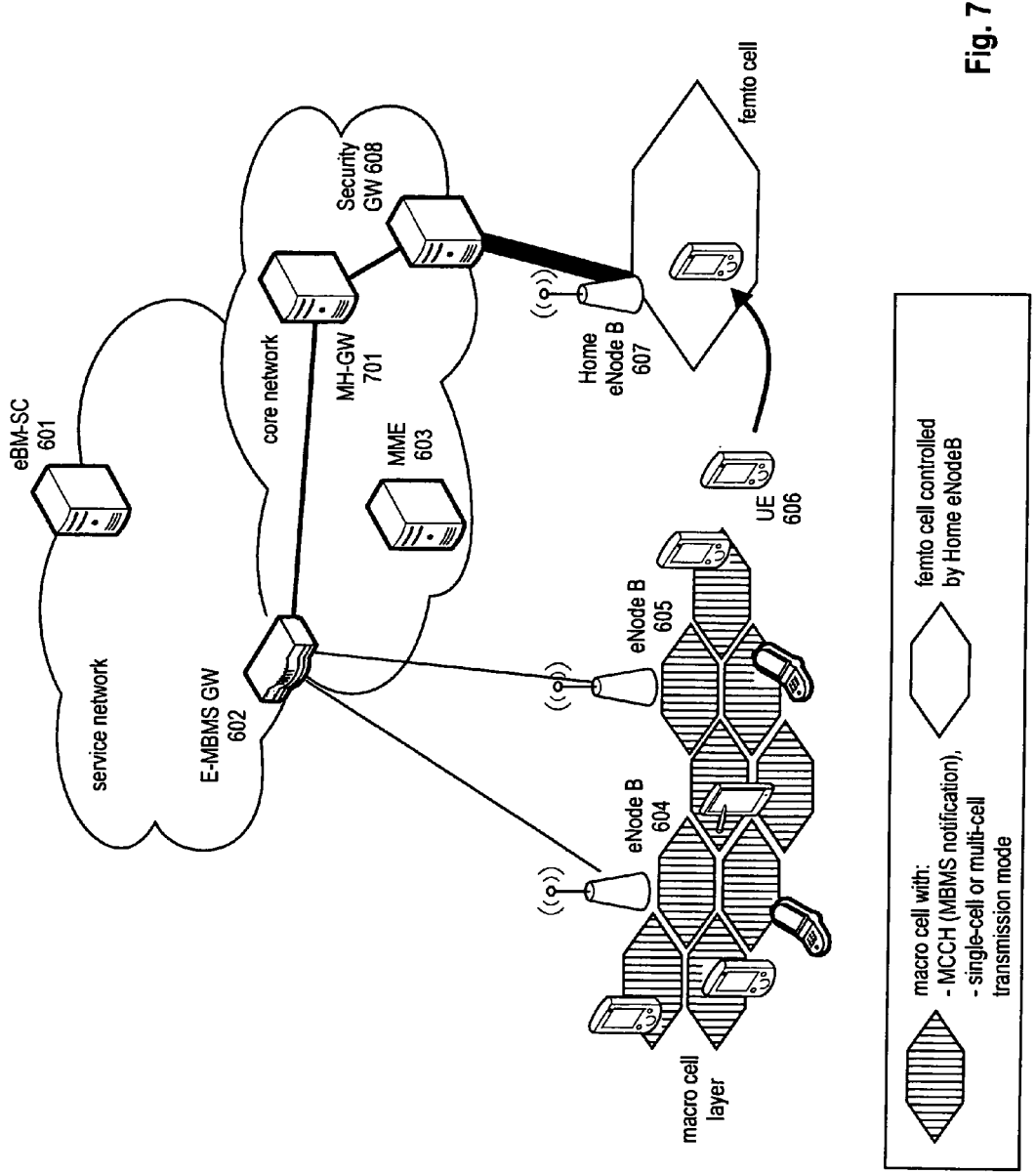

In order to keep the security layer separated and independent of requirements coming from support of multicast or broadcast services at home base stations, an operator may deploy a logical entity comprising multicast related functions required to support home base stations. For example such functions may comprise the termination of control plane interfaces, e.g. including multicast group management on behalf of the home base stations, and termination of user plane interfaces, e.g. including transmission of service data packets to appropriate home base stations. This new entity may be called a Multicast Home eNodeB Gateway (MH-GW 701) and may be deployed as a dedicated entity in the operator's core network, as depicted in FIG. 7. However, depending on architectural requirements of the operator it may be integrated with existing entities in the core network, e.g. the Security GW 608. MH-GW 701 may also be deployed in the radio access network (RAN) of the mobile communications network, either as a stand-alone entity or integrated with existing entities there.

Considering an exemplary MBMS architecture as shown in FIG. 7, delivery of a multicast or broadcast service to home base stations may be optimized like described in the following. A related example signaling flow is depicted in FIG. 8.

Figure 8:
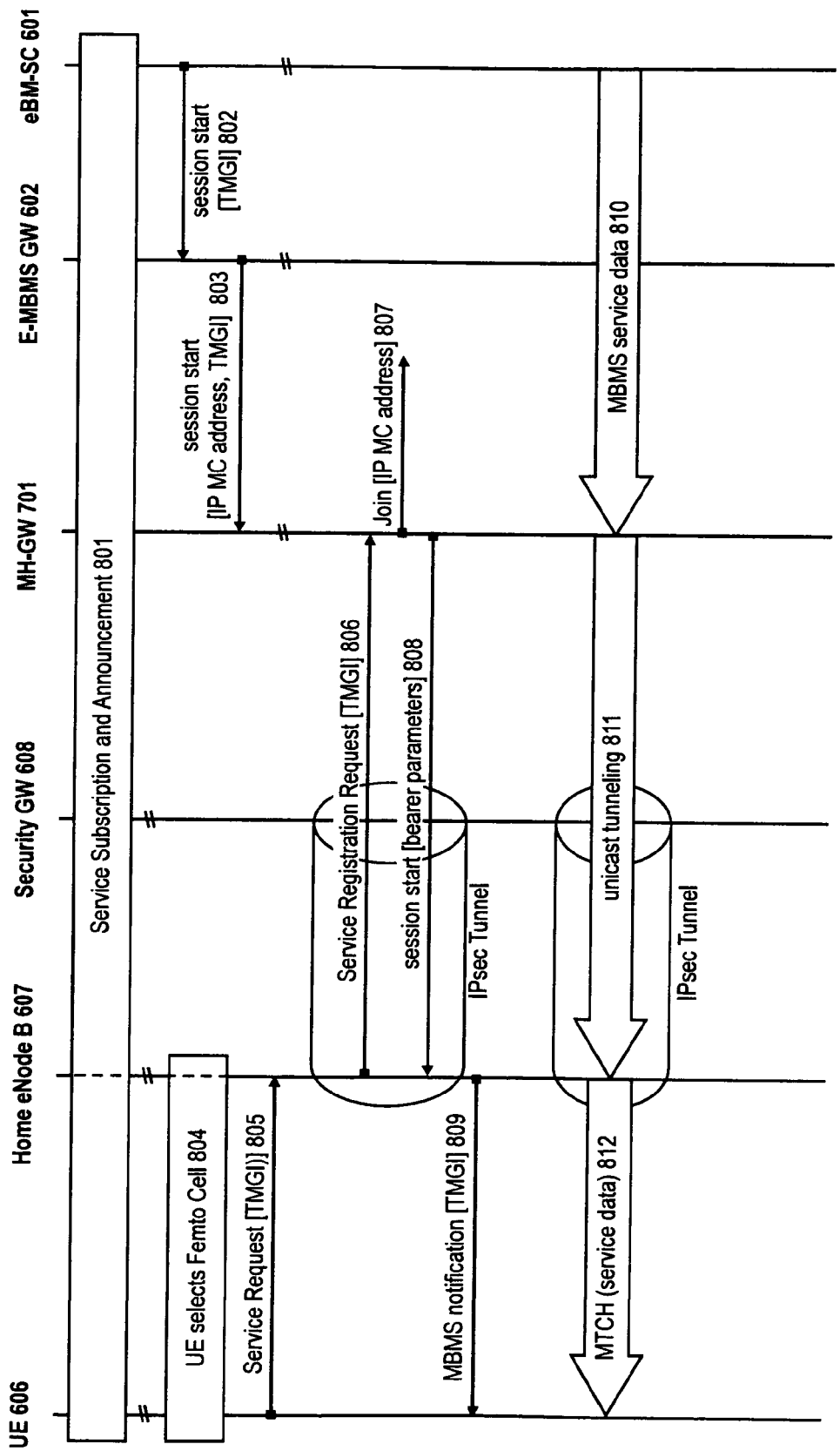
FIG. 8 shows an exemplary signaling flow for setting um an MBMS service in a femto cell controlled by a home base station (Home eNodeB 607) according to one exemplary embodiment of the invention.

FIG. 8 shows an exemplary signaling flow for setting up an MBMS service in a femto cell controlled by a home base station (Home eNodeB 607) according to one exemplary embodiment of the invention. In the exemplary signaling flow, it is assumed that UE 606 has been attached (or is also still attached) to the mobile communication system through one of NodeBs 604, 605 offering macro cell layer access to UE 606 (see FIG. 6 and FIG. 7) and has received 801 the service announcement for an MBMS service through on of the macro cells (e.g. a macro cell controlled by eNodeB 605) and has subscribed to the service. Optionally, the UE may also identify start or ongoing distribution of the service from reading macro layer cell information like MCCH, in case macro cell coverage is overlapping the femto cell.

Furthermore, eBM-SC 601 may be considered having provided 802, 803 the session start message for this MBMS service (identified by a service identifier, here a TMGI) via E-MBMS GW 602 to MH-GW 701. A TMGI is a unique identifier in the operator's network but is not necessarily related to the IP multicast address for user plane service data. E-MBMS GW 602 further may add the IP multicast address (IP MC address) used for the MBMS user plane (i.e. the service data) to the session start message to allow interested nodes to join the multicast (see step 807). The session control signaling (including the session start message) related to the MBMS service is not further propagated downstream by MH-GW 701 unless a mobile terminal is requesting the service.

A mobile terminal (UE 606) may for example move into the coverage area of the femto cell controlled by Home eNodeB 607 from a macro cell and attaches 804 to the femto cell. Upon detecting that the MBMS service not being available in the femto cell (e.g. due to the absence of a corresponding MBMS notification in the femto cell), UE 606 may request 805 the service from Home eNodeB 607 by sending a service request message indicating the desired service (e.g. by means of its service identifier, here the TMGI). Home eNodeB 607 receiving a service request from UE 606 registers 806 for the service at MH-GW 701. Home eNodeB 607 may know the MH-GW 701 by pre-configuration (O&M), e.g. provided during attachment (e.g. after power up) of the Home eNodeB 607 to the operator's network. Home eNodeB 607 may register at MH-GW 701 only once for a specific service, e.g. triggered by the first MBMS service request received from a mobile terminal MH-GW 701 may have already received 803 a session start message for this service or it will receive it as soon as it is distributed in the operator's network. Generally, in order to receive session control signaling, MH-GW 701 may be configured as being part of the MBMS service area or being part of relevant entities to receive this signaling. For example, when E-MBMS GW 602 receives 802 a session start message it may, send 803 a session start message to MH-GW 701, based on the indicated service area or based on indicated entities, which may be called "list of downstream nodes". Alternatively, MH-GW 701 may also actively request to be included in the distribution of session control signaling, when MH-GW 701 has received a service registration request from a Home eNodeB, at another network entity, e.g. the E-MBMS GW 602 or the eBM-SC 601.

MH-GW 701 having received a session start message from the network, e.g. from E-MBMS GW 602, may send 808 a session start message to all previously registered Home eNodeBs (here Home eNodeB 607). This session start message may be modified by MH-GW 701 in comparison to the session start message received from the E_MBMS GW 602, as IP multicast may not be supported by the interface between MH-GW 701 and Home eNodeB 607. Therefore, MH-GW 701 may modify the session start message to include required information for MBMS user plane data distribution, e.g. unicast parameters. MH-GW 701 may further join 807 the IP multicast address used for distribution of MBMS user plane data on behalf of Home eNodeB 607. Subsequently, MH-GW 701 may forward 810, 811 single copies of received IP multicast data packets of the MBMS service to all registered Home eNodeBs according to user plane parameters indicated to the Home eNodeBs previously. User plane data may thereby be tunneled to Home eNodeB 607 via a secure tunnel as discussed with respect to FIG. 7 above.

Home eNodeB 607 receiving the session start message from MH-GW 701 may start broadcasting 809 a notification, e.g. MBMS Notification, in the femto cell, informing present mobile terminals on the distribution of the MBMS service and required parameters to receive the data. In addition Home eNodeB 607 may establish a radio bearer in the femto cell, e.g. MTCH, in order to broadcast received service data packets. UE 606 that initially sent the service request (and all other terminals located in the femto cell) may receive 812 the MBMS service.

Utilizing previously described mechanisms the delivery of multicast or broadcast services may be optimized in several areas. One of the main aspects is that session control signaling is only distributed to areas in which an actual demand for the service exists, as distribution is based on active service request from a mobile terminal. Further, a separation of multicast delivery mechanisms from required security mechanisms for home base stations is facilitated, keeping both layers independent. Distribution of multicast or broadcast service may take interface capabilities between proxy gateway and home base stations into account, while allowing utilization of resource efficient IP multicast transport as much as possible. For example, IP multicast may be used for distribution of the service within the operator's core network and unicast distribution may only be used between the proxy gateway and the home base stations.

Maximizing the utilization of IP multicast may be achieved by the proxy gateway joining the MBMS user plane in the operator's network on behalf of the home base stations. Accounting for the interface capabilities towards the home base stations may be achieved by sending a modified session start in order to configure a unicast bearer between proxy gateway and the home base stations. Additionally, the same unicast bearer may be shared for all subscribers located in the femto cell.

As pointed out before, there may be several options how to deploy the proxy gateway, e.g. as a stand-alone entity in the core network or radio access network or even integrated with an existing entity in the core network or radio access network of the mobile communications network. Although, the basic mechanism remains the same, the actual option for the proxy gateway, location may have some impacts, mainly on the distribution of session control signaling. In one example the proxy gateway (here MH-GW 701), might be integrated with E-MBMS GW 602 (or the MBMS1 or MBMS2 entity). These entities are typically configured in the eBM-SC, e.g. in the so-called "list of downstream nodes", as targets for receiving session control signaling. Hence, the proxy gateway integrated to E-MBMS GW 602, will be aware of the signaling by default.

In case the proxy gateway is deployed as a stand-alone entity or integrated with an entity not directly related to the MBMS architecture, e.g. as security gateway as Security GW 607, the proxy gateway may be registered at the eBM-SC or E-MBMS GW 602 respectively.

In another option, the proxy gateway may also dynamically request, e.g. triggered by received home base station registrations, to receive session control signaling similar to mobility management entity MME 104 in the exemplary embodiments described above.

A further option is to deploy the proxy gateway in the radio access network, either as stand-alone or integrated with an existing entity (like a Multi-cell Coordination Entity MCE or eNodeB). In this case, MH-GW 701 as an example of a proxy gateway may be configured at E-MBMS GW 602 as part of the MBMS service area, so that MH-GW 701 will receive session control signaling similar to a macro eNodeB. Also here it may be possible that MH-GW 701 is not included in the configuration by default, but registers dynamically based on Home eNodeB request.

In the exemplary embodiments described above with respect to FIG. 7 and FIG. 8, it has been assumed that a home base station is generally authorized to receive the multicast or broadcast service by a proxy gateway (as MH-GW 701) which is registering to the service on behalf of the home base station and which is forwarding the user plane data to the home base station.

Furthermore, the implementation above has not addressed the issue of service continuity when a mobile terminal is moving from a femto cell to a macro cell. In order to be able to assure service continuity, according to one aspect of the invention, it is proposed that the delivery mechanism used for distribution of a multicast or broadcast service to a home base station is decided depending on the location of the home base station with respect to the service area of the multicast or broadcast service.

The service area in which a multicast or broadcast service is to be distributed is typically configured in the mobile communications network. The service area configuration may be taken into account for distribution of session control signaling, as well as for distribution of the service data. For example session control signaling, like session start messages, may be delivered to all base stations located inside the service area. Subsequently, service data may be distributed to all cells comprised in the service area. The service area configuration maintained in the network identifies the base stations and/or cells to which service data (and optionally control signaling) is to be delivered. A session control message may contain information about the service area in which it should be distributed. For example the entity sending the session control message, e.g. eBM-SC 601, knows all signaling destinations, e.g. base stations, and includes this information in the session control message. The intermediate network may use this information to identify where to distribute the message.

If the service area is large, e.g. comprising many base stations, though it would be possible, it may however be not feasible to include information about all required destinations in the rather small signaling messages. Therefore, instead of directly identifying the individual destinations, only a reference to them may be used in the signaling messages. An identifier, a so-called service area identifier, is a typical example of such a reference. With respect to MBMS services this service area identifier may be referred to as a MBMS Service Area Identifier (MBMS SA-ID). Further, the network may be configured with a mapping of service area identifiers to appropriate destinations, e.g. base stations or cells. Upon receiving a session control message comprising a service area identifier at an entity, the entity may check maintained mapping information for the service area identifier to identify the destinations to which the message should be forwarded.

In general, distribution of a multicast or broadcast service to a home base station, e.g. a Home eNodeB, may need to be authorized by the network, e.g. an eBM-SC. For example, there may exist service-based policies whether distribution to home base stations is allowed or not. This authorization may be performed when a home base station registers in the network for a specific service, e.g. triggered by the reception of a service request from a mobile terminal. During the authorization the network may acquire information about the location of the home base station. For example, this information may be provided by the home base station itself or it may be already known to the network.

The network may also utilize the location information to decide the delivery mechanism that should be used for the distribution of the multicast or broadcast service to the home base station.

The decision could depend on the home base station's location with respect to the service area of the multicast or broadcast service that is to be distributed. For example, in case the home base station is located inside the service area of the multicast or broadcast service, optimized multicast delivery towards the home base station will be used. This allows resource efficient distribution of the service data to the home base station. If for example the home base station is located outside the service area of the multicast or broadcast service, unicast delivery towards the mobile terminal requesting the service from the home base station may be necessary in order to assure service continuity for subscribers moving between the femto cell and the macro cells while receiving the service.

Typically, in the macro cell layer a resource efficient "shared" multicast or broadcast bearer service for distribution of a multicast or broadcast service may only be used within its service area. Outside the service area the service may only be accessible using a direct unicast bearer between the mobile terminal and the service source, e.g. an eBM-SC. In case a home base station located outside the service area of multicast or broadcast service is using multicast delivery to serve the service in the femto cell, a mobile terminal moving to a macro cell would be required to establish a unicast bearer first, before it may be able to continue reception of the service. This may be a rather time consuming procedure which could lead to noticeable service interruption. On the other hand, if the mobile terminal already maintains a unicast bearer for receiving the multicast or broadcast service while being located in the femto cell, the existing unicast bearer would just have to be relocated during mobility to the macro cell, which potentially avoids service interruptions. This way optimized resource utilization for distribution of multicast or broadcast services to home base stations via a shared bearer service may be used as often as possible, while service continuity for mobile terminal mobility between femto cells and macro cells outside the corresponding service area may be assured.

The mobile operator may not be able to control or plan the deployment of home base stations. Further, the subscribers may obtain the home base station devices independent of the mobile operator. However, in order to assure proper operation of the entire mobile communications system, several parameters in the home base stations need to be configured, for example comprising radio-level or network-level configurations.

Typically, these parameters mainly depend on the operator's configuration of the mobile communications system. The operator may require similar control of the home base stations and their configuration, as maintained for the macro cell layer controlled by "normal" base stations. This configuration and control of a home base station may automatically be established when the home base station connects to the operator's network. Before and during this step, the home base station may be in a pre-operational state, in which utilization of the femto cell may not be possible yet.

Usually, in addition to the configuration of the home base station also authentication and authorization procedures may be required to be performed successfully. As pointed out before, the subscriber may be in control of the home base station deployment, i.e. may independently decide where and when to set-up a femto cell. At any time the subscriber may easily change the deployment, for example move the home base station to a different location, e.g. a friend's house. Therefore, as part of the pre-operational procedures and information, the mobile operator may require knowledge of the home base station's location. For example, this may be provided to the core network during pre-operational authentication and authorization procedures.

According to the requirements of the operator and possibly depending on the capabilities of the home base stations there may exist several options regarding what kind of home base station location information is provided. A typical example might be to utilize Global Positioning System (GPS) information. Obviously, this requires the home base station is equipped with a GPS receiver and the possibility to receive a GPS signal when operating the home base station.

In another example, signals of overlapping macro cells may be utilized to determine the position of the home base station. The home base station might be aware of corresponding macro cell layer system information like cell identifiers or tracking area identifiers of macro cells overlapping in coverage with the femto cell controlled by the home base station. Together with these identifiers the home base station might report information about received radio signals from the corresponding macro layer cell, for example allowing the network to triangulate the home base station's position.

There are also other options that may be utilized to determine the home base station location that are not directly based on wireless location techniques. An option might be to determine the location of the home base station based on knowledge about the wired access network used by the home base station to connect to the operator's network. For example the port-ID used in a DSLAM of a DSL access or the circuit-ID of a cable access network may be used by an operator to conclude the location of a home base station. Theses kind of options may be particularly relevant if the operator also controls the wired access network used by the home base station.

Further options may for example be based on IP addresses allocated by an Internet Service Provider (ISP) that are used by the home base station when accessing the operator's network. The location might be resolved using a database containing a mapping between IP subnets and geographical locations. A rather simple but also possible option may be to locate the home base station based on subscriber configuration, e.g. using postal addresses or geographical coordinates.

Figure 9:
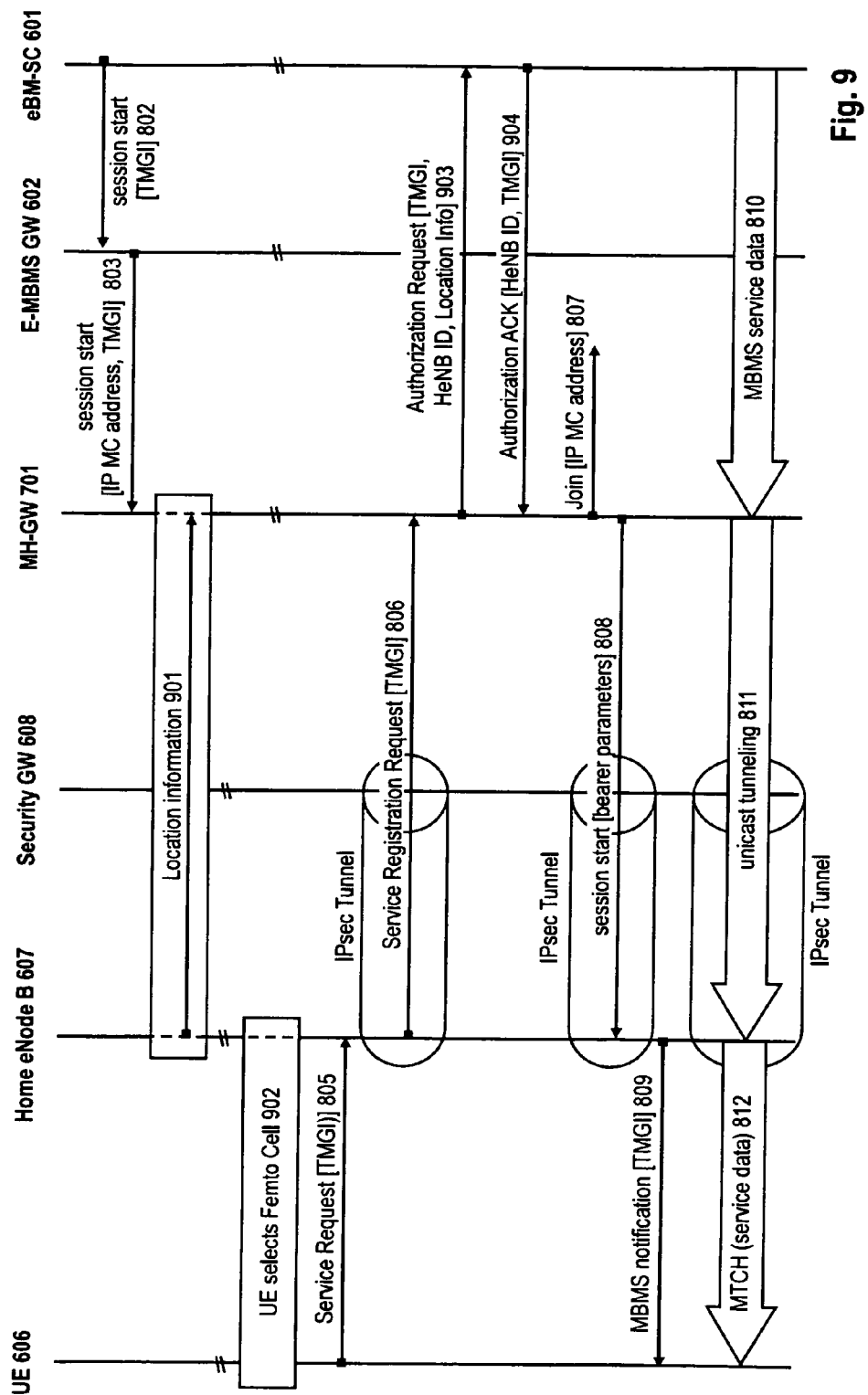
FIGS. 9 & 10 show an exemplary signaling flow for setting up an MBMS service in a femto cell controlled by a home base station (Home eNodeB 607) according to one exemplary embodiment of the invention, including a decision on the delivery mechanism for the service data based on the location of the home base station.
Figure 10:
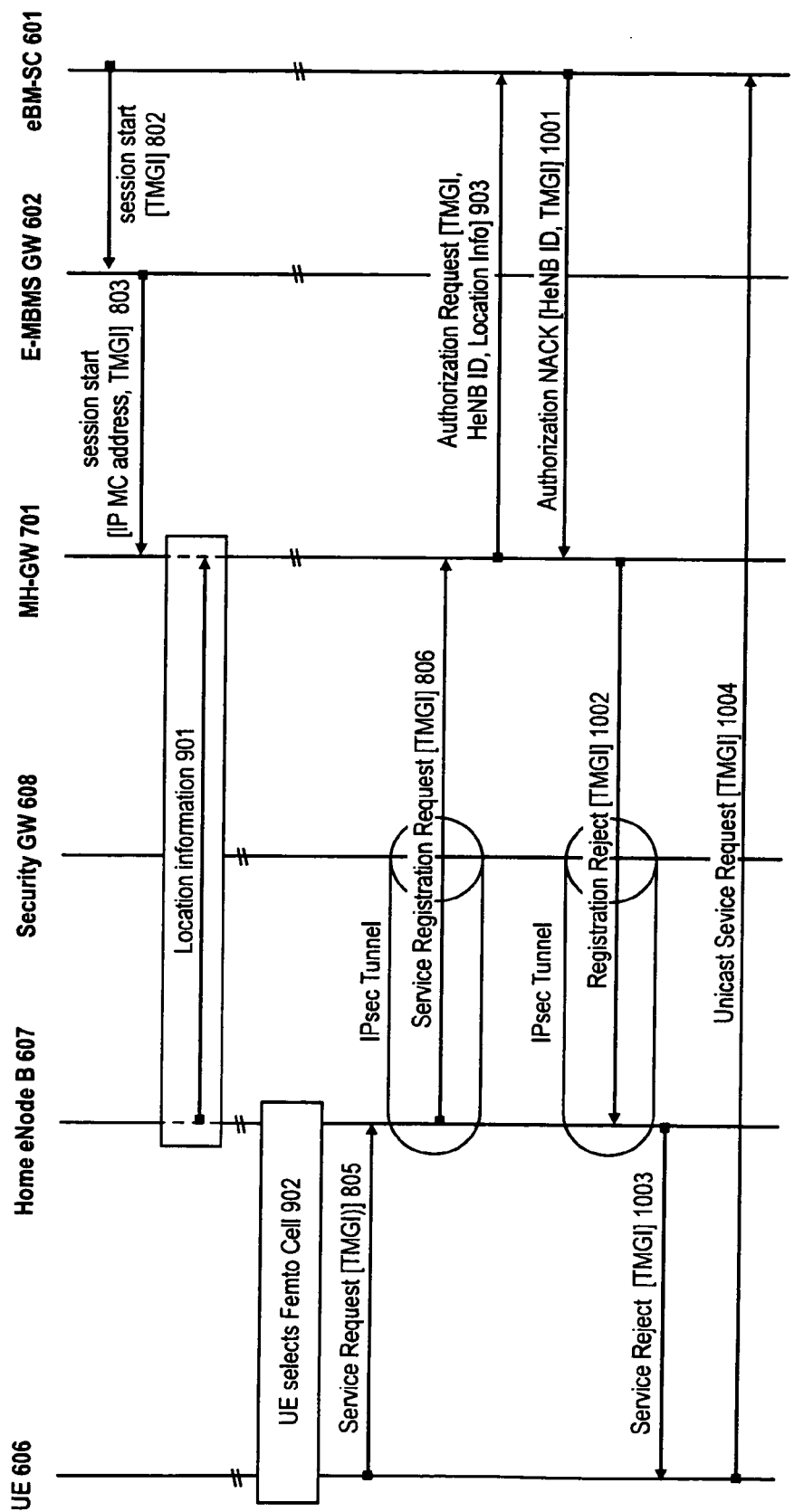

FIG. 9 and FIG. 10 show an exemplary signaling flow for setting up an MBMS service in a femto cell controlled by a home base station (Home eNodeB 607) according to one exemplary embodiment of the invention, including a decision on the delivery mechanism for the service data based on the location of the home base station. Substantially, the signaling flow in FIG. 9 and FIG. 10 may be considered an extension of the signaling flow shown in FIG. 8. Accordingly, steps that are similar to the signaling flow in FIG. 8 are marked with the same reference numerals. It may be assumed that location information of Home eNodeB 607 is provided 901 to MH-GW 701 when it connects to the operator's network. Alternatively, MH-GW 701 may be able to request the location information from a different entity as needed.

UE 606 attaching 902 to the femto cell controlled by Home eNodeB 607 may send 805 a service request in order to receive a desired multicast or broadcast service. An appropriate service identifier, e.g. TMGI, in the service request, might identify the requested service. This may trigger the receiving Home eNodeB 607 to register itself at MH-GW 701 for the service in order to be included in the distribution of the corresponding multicast or broadcast service data. Therefore, Home eNodeB 607 sends 806 an service registration request message to MH-GW 701 also containing the service identifier, e.g. TMGI, as provided by UE 606.

Generally, Home eNodeB 607 needs to register at a MH-GW only once per service. Hence, the service registration request message may only be sent for the first service request received from an UE for a particular multicast or broadcast service. As stated before, MH-GW 701 may already have received (802, 803) session control signaling like a session start message for the service that is requested by Home eNodeB 607. MH-GW 701 might also have to wait until such signaling is distributed in the network. Alternatively, MH-GW 701 may also actively request to receive corresponding session control signaling from the network.

The network might take the location information on Home eNodeB 607 into account when deciding the delivery mechanism for the distribution of a multicast or broadcast service to Home eNodeB 607. Hence, when MH-GW 701 receives 806 a service registration request message for a multicast or broadcast service from Home eNodeB 607, it sends 903 a request for authorizing service delivery to an appropriate entity in the mobile communications network, which is eBM-SC 601 in this exemplary embodiment.

Beside a service identifier, this authorization request also includes location information on the Home eNodeB 607 location. Alternatively, instead of including the location information, the request may only comprise a Home eNodeB identifier, which may be used by the receiving entity to request respective location information from another entity or the receiving entity itself may already comprise the location information.

As shown in FIG. 9, it may be considered that eBM-SC 601 is the network entity authorizing service delivery to Home eNodeB 607 and deciding the delivery mechanism based on the location of Home eNodeB 607. An eBM-SC is one of the entities which may decide on the delivery mechanism for the multicast or broadcast service, as the eBM-SC typically comprises service configuration information and may also comprise information regarding the corresponding service area.

MH-GW 701 may be required to authorize service delivery of multicast or broadcast service to a Home eNodeB only once per Home eNodeB and service. Hence, before sending 903 an authorization request, MH-GW 701 may first check whether it already preformed this step successfully.

Upon reception of the authorization request with Home eNodeB location information, eBM-SC 601 may compare the location information with the configured service area of the requested multicast or broadcast service. One option may be that eBM-SC 601 maintains geographical information about the service area. By comparing this with the geographic information on the location of Home eNodeB 607, eBM-SC 601 may be able to decide whether Home eNodeB 607 is located inside or outside of the service area. Another option may be that service area is configured using macro layer information, e.g. consisting of cell identifiers or tracking area identifiers. Optionally, eBM-SC 601 may need to translate service area or Home eNodeB location information before being able to compare them. In this situation, eBM-SC 601 could for example also request this "translation" at another network entity.

In case eBM-SC 601 determines that Home eNodeB 607 is located inside of the service area of the requested multicast or broadcast service, it sends 904 an acknowledgement (Authorization ACK) of the authorization to MH-GW 701. This acknowledgement may comprise Home eNodeB 607 identifier of the authorized Home eNodeB and optionally the service identifier of the requested service in order to allow MH-GW 701 to correlate the acknowledgement response to the appropriate request. Subsequently, following this positive response, MH-GW 701 may forward 808 session control signaling regarding the service to the authorized Home eNodeB 607. For example, MH-GW 701 may send a session start message to Home eNodeB 607 that comprises the required bearer parameters used to distribute the service data of the multicast or broadcast service from MH-GW 701 to the Home eNodeB 607.

Furthermore, MH-GW 701 starts sending 811 service data packets received 810 for the service towards Home eNodeB 607. In case the network utilizes IP multicast for distribution of the service data, MH-GW 701 may first have to join 807 the corresponding multicast group address. However, this has to be done only once per multicast or broadcast service. Hence, if MH-GW 701 has already joined before, it may directly start distributing received service data packets towards Home eNodeB 607.

Home eNodeB 607 receiving 808 session control signaling like session start message may start to broadcast 809 a service notification into its femto cell informing present UEs about the transmission of the multicast or broadcast service. Additionally, it may set up an appropriate radio bearer used for broadcasting the received service data packets into the femto cell. Finally, the UE 606 that initially sent the service request for the multicast or broadcast service may be able to receive 812 the service data.

In case eBM-SC 601 determines that Home eNodeB 607 is located outside the service area of the multicast or broadcast service, it may respond 1001 to the authorization request of MH-GW 701 with an authorization reject (Authorization NACK), as shown in FIG. 10. The reject message may comprise the identifier of Home eNodeB 607 (HeNB ID) and optionally the service identifier of the requested service in order to allow MH-GW 701 to correlate the acknowledgement response to the appropriate request. Upon reception of the authorization reject, MH-GW 701 may send 1002 a service registration reject message to Home eNodeB 607 that previously sent the service registration message. In order to identify the corresponding service the service registration reject message may comprise an appropriate service identifier, e.g. TMGI.

Finally, the service registration reject may trigger Home eNodeB 607 to respond 1003 to the UE 606 with a service reject message. Similarly, an appropriate service identifier may be used to identify the rejected service. Receiving this negative response may trigger the UE 606 to request 1004 unicast delivery of the multicast or broadcast service. This unicast service request may be a required option in order to assure service continuity in case of UE 606 mobility towards the macro cell layer. The information required for the UE 606 to request unicast delivery may already be known to UE 606, e.g. from a previously received service announcement. Optionally the information may be included in the reject message provided from the network. For example this information may contain an URI identifying the BM-SC from which UE 606 needs to request unicast delivery of the service.

Another option is that the service registration reject message automatically triggers a network-based procedure establishing a unicast bearer towards the UE 606 for service delivery.

The unicast bearer for the service delivery may typically be provided in the femto cell of Home eNodeB 607. If the service registration reject message indicates that no service delivery within femto cells is allowed at all (e.g. due to service configuration requirements) this may be indicated be Home eNodeB 607 to UE 606 in the service reject message and UE 606 may send 1004 the unicast service request through a macro cell layer to request service delivery using a unicast bearer service.

Figure 11:
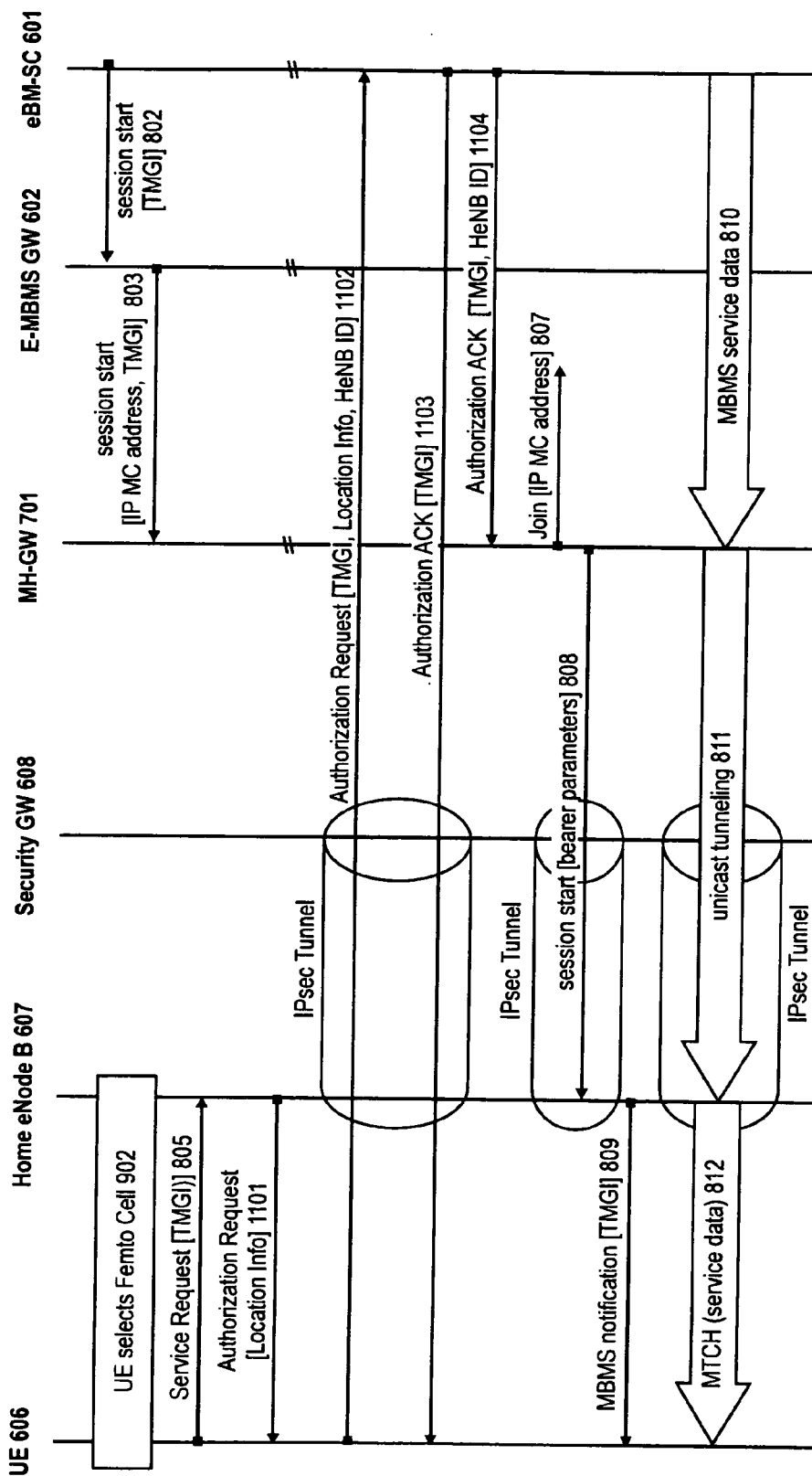
FIGS. 11 & 12 show another exemplary signaling flow for setting up an MBMS service in a femto cell controlled by a home base station (Home eNodeB 607) according to one exemplary embodiment of the invention, including a decision on the delivery mechanism for the service data based on the location of the home base station provided by a mobile terminal.

In the embodiment of the invention discussed with respect to FIG. 9 and FIG. 10 above, location information on the home base station's location is available in the network. In one example, the location information may be included in the service registration request message transmitted by Home eNodeB 607 when registering 806 for delivery of multicast or broadcast service. Hence, in this example, the network provides location information on the home base station to the entity deciding the delivery mechanism used for distributing the multicast or broadcast service, e.g. eBM-SC 601. Another option may be that this information is provided by the mobile terminal. This may be particularly applicable in case the UE 606 already maintains a connection to the entity deciding the delivery mechanism. This approach will be outlined in the following in further detail with respect to FIG. 11 and FIG. 12, which show another exemplary signaling flow for setting up an MBMS service in a femto cell controlled by a home base station (Home eNodeB 607) according to one exemplary embodiment of the invention, including a decision on the delivery mechanism for the service data based on the location of the home base station provided by a mobile terminal.

In this exemplary embodiment of the invention, it may be assumed that UE 606, when connected to the mobile communications network, maintains a connection to eBM-SC 601. Upon UE 606 sending 805 a service request for a desired multicast or broadcast service to Home eNodeB 607 controlling the femto cell in which the UE 606 is located, Home eNodeB 607 informs 1101 UE 606 that an authorization of service delivery is required. Further, Home eNodeB 607 may include appropriate location information in the authorization request sent 1101 to UE 606. Of course, acquisition of a Home eNodeB authorization for service delivery may only be required once per multicast or broadcast service. UE 606 receiving the indication that an authorization is required sends 1102 an appropriate authorization request to eBM-SC 601. Beside location information on the location of Home eNodeB 607 as received from Home eNodeB 607, the authorization request may also comprise a Home eNodeB identifier of Home eNodeB 607 and a service identifier. Similar to the previous example discussed above with respect to FIG. 9 and FIG. 10, eBM-SC 601 may decide required delivery mechanism for the service distribution based on the location information in the authorization request message.

In case Home eNodeB 607 is located inside the service area of the requested multicast or broadcast service, eBM-SC 601 may respond 1103 to UE 606 with an authorization acknowledgement message (Authorization ACK) informing UE 606 that Home eNodeB 607 is authorized to receive the service. A service identifier in the authorization acknowledgement may be used to identify the service.

UE 606 may subsequently inform Home eNodeB 607 about the successful authorization and may await indication of service delivery, which may trigger Home eNodeB 607 to register in the network for service delivery, e.g. at MH-GW 701. However, depending on the operators' requirements this kind of mechanism may not be sufficiently secure. As a successful authorization causes the allocation of network and radio resources, the operator may require this to be triggered by trusted entities. In contrast to entities of the mobile communications network directly controlled by the operator, the UEs may generally not be trusted. Hence a similar mechanism as describe previously may be foreseen, where eBM-SC 601 provides 1104 an authorization acknowledgment message to MH-GW 701 that is including an identifier of the authorized Home eNodeB and the multicast or broadcast service for which the authorization of the Home eNodeB has been requested and granted. In any case on successful authorization, MH-GW 701 may distribute 808 session control signaling (which typically includes the service identifier, e.g., in the session start messages) and service data packets to the authorized Home eNodeB 607, which may broadcast 809 service notification and service data in the controlled femto cell. Finally allowing the UEs to receive 812 the requested multicast or broadcast service as outlined before.

Figure 12:
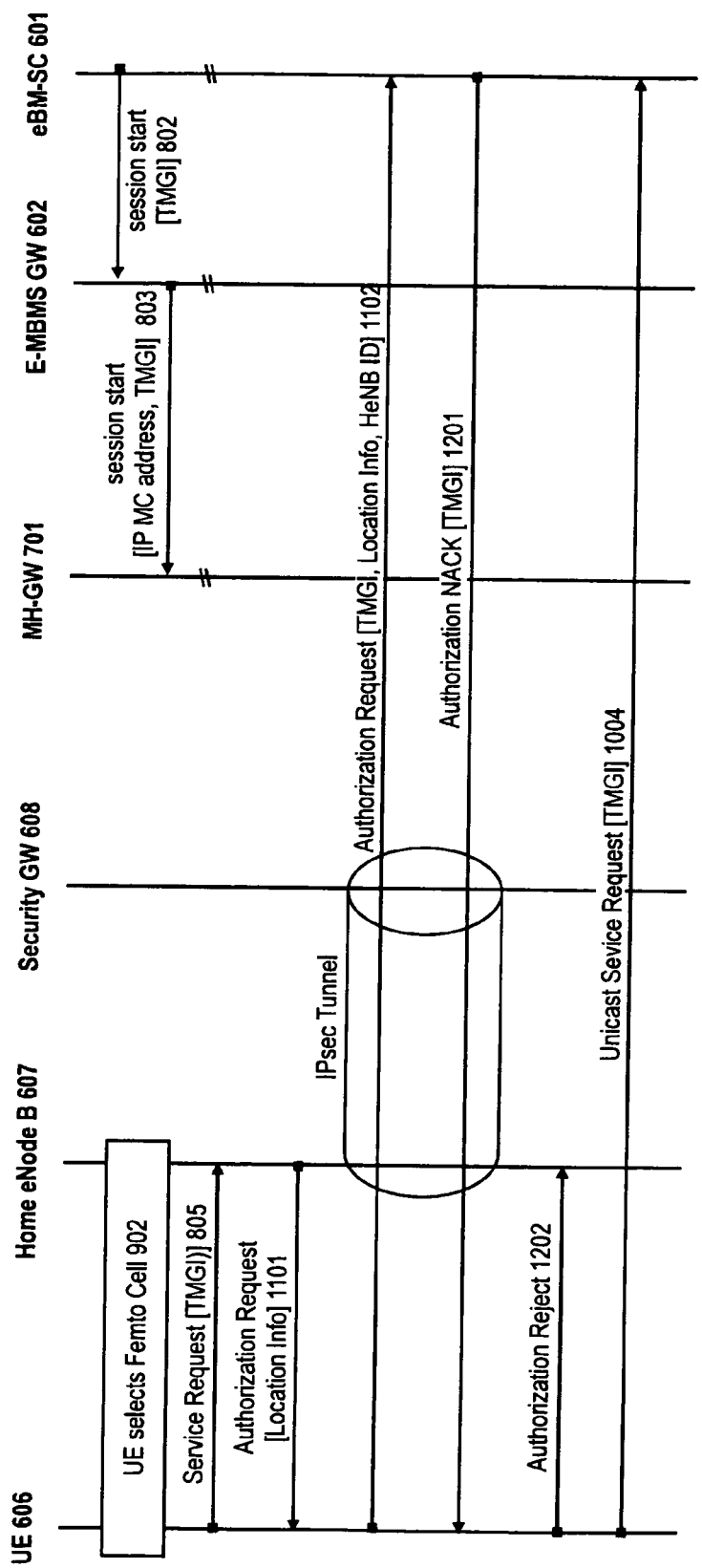

Turning now to FIG. 12, in case Home eNodeB 607 is located outside the service area of the requested service, eBM-SC 601 may respond 1201 with an authorization reject message (Authorization NACK) to UE 606. This response may trigger UE 606 to request 1004 unicast delivery from eBM-SC. Optionally, the rejection of the authorization by eBM-SC 601 may contain required information to establish a unicast bearer for delivery of the multicast or broadcast service to UE 606.

Compared to the previously described mechanism this may reduce the service delivery delay in case only unicast delivery can be utilized. When receiving the authorization reject message, UE 606 may optionally inform 1202 Home eNodeB 607 on the failed authorization. Subsequently, Home eNodeB 607 may take this into account in case it receives another UE 606 request for the same service.

Alternatively, Home eNodeB 607 may also start a timer when sending the initial indication of required delivery authorization to a requesting UE. The timer value may be chosen in a way that a successful response will be surely received. In case no response is received before expiration of the timer, Home eNodeB 607 may conclude that it is not authorized.

According to the mechanisms discussed previously, the network entity deciding the delivery mechanism of a multicast or broadcast service, possesses knowledge about the corresponding service area configuration. Further, the network entity may possess information about the mapping of the service area configuration to the topology of the mobile communications network.

It may be the case that this kind of information is not available in an entity like the eBM-SC. It may also not possible for the eBM-SC to request this from another entity in the mobile communications network. Typically, the service area is only known based on a reference like a service area identifier, e.g. MBMS Service Area ID (MBMS SA-ID). This service area identifier may be included in the session control signaling like the session start message. The actual mapping of the service area identifier to entities of the mobile communications network, e.g. eNodeBs or cells, is configured in the required network entities, e.g. E-MBMS GW 602 or eNodeBs. For example the mapping information may be based on tracking area identifiers or cell identifiers to define the service area of a multicast or broadcast service. As a result, the service-level configuration can be kept independent of the network-level configuration. An operator of a mobile communications network may require the service-level configuration being independent from the network-level configuration, for example, if an external entity is providing the service.

It may be assumed that the service area configuration maintained in the entities of the mobile communications network are rather statically configured, e.g. using an O&M system. For example, this may be similar to (or even re-using) configurations of IDLE mode mobility areas like tracking areas. As pointed out before, an operator, e.g. based on careful planning, rather statically deploys the macro cell layer of a mobile communications network. In contrast to the rather dynamic deployment of home base stations, which may be under control of an individual subscriber. Therefore, it may be assumed that the service area is configured based on macro cell layer information and may not include information about home base station or femto cells. As a result, even in case the entity deciding the delivery mechanism for distribution of multicast or broadcast service does maintain knowledge about network-level configuration, it may not be possible to decide whether a home base station is located inside or outside of the service area based location information on the respective home base station.

A solution to these problems may be to first identify macro layer information corresponding to the home base station in question and second to utilize this macro layer information to resolve corresponding service area identifiers in appropriate entities of the mobile communications network. This allows a eBM-SC to authorize and decided the delivery of a multicast or broadcast service, while minimizing additionally required functionality or configuration at the eBM-SC.

Figure 13:
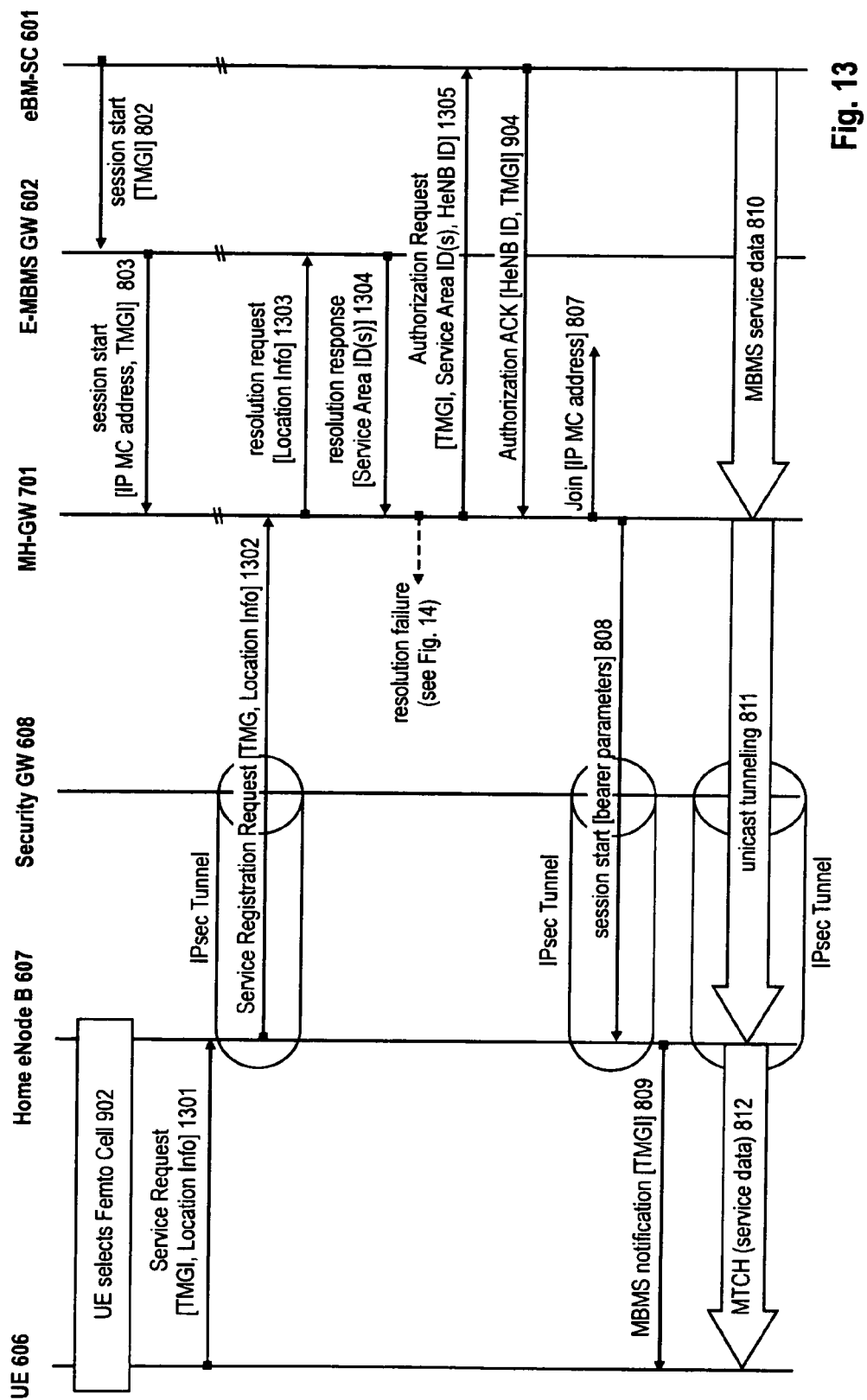
FIGS. 13 & 14 show an exemplary signaling flow for setting up an MBMS service in a femto cell controlled by a home base station (Home eNodeB 607) according to one exemplary embodiment of the invention, including a decision on the delivery mechanism for the service data based on macro cell layer location information on the home base station.
Figure 14:
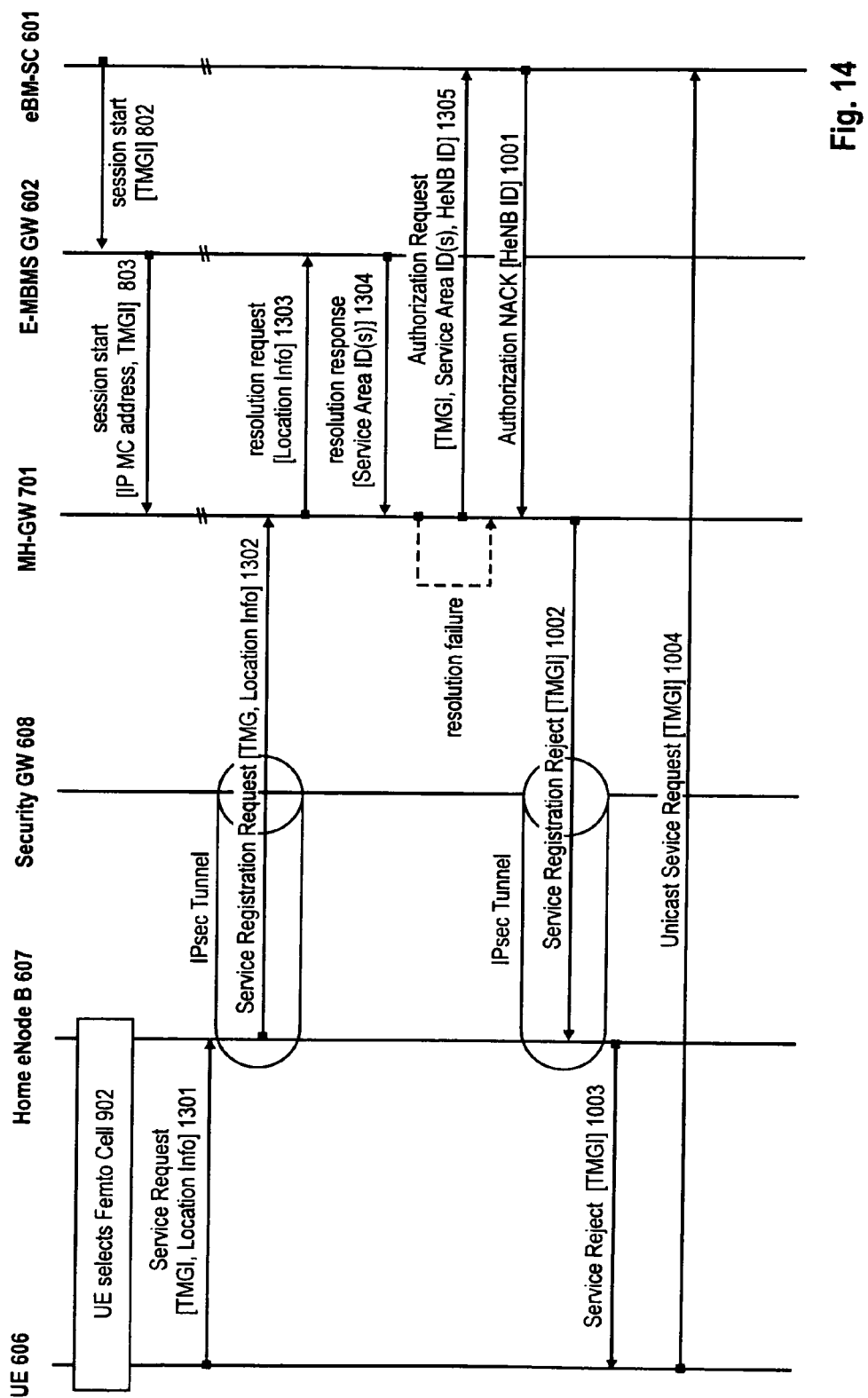

This approach will be discussed in further detail below with respect to FIG. 13 and FIG. 14. FIG. 13 and FIG. 14 show an exemplary signaling flow for setting up an MBMS service in a femto cell controlled by a home base station (Home eNodeB 607) according to one exemplary embodiment of the invention, including a decision on the delivery mechanism for the service data based on macro cell layer location information on the home base station.

UE 606 being attached 902 to a femto cell controlled by Home eNodeB 607 may be assumed to continuously perform measurements detecting available cells in its range.

Theses measurements may for example be performed during periods in which UE 606 is not receiving or transmitting other traffic. In case one or more macro cells also cover the femto cell in which the UE 606 is located, UE 606 may perform measurements for these macro cells of the macro cell layer. During the measurement, UE 606 may receive system information like cell identifier or tracking area identifier of the corresponding macro cell(s).

When UE 606 sends 1301 a service request for a desired multicast or broadcast service to its current Home eNodeB 607, UE 606 may include the detected macro cell layer information (e.g. cell identifier(s) or tracking area identifier(s) of the corresponding macro cell(s)) to this service request. Home eNodeB 607 receiving a service request may send 1302 a service registration request to the network to be included in the distribution of the requested service. In this service registration request message, Home eNodeB 607 may include the macro cell layer information (Location Info) received from UE 606 and the service identifier of the requested service.

MH-GW 701 receiving the service registration request message may use the included macro cell layer information to resolve corresponding service area identifiers according to configuration maintained in the network. One option may be that MH-GW 701 itself comprises such configuration information. Another option might be that it request resolution from another entity of the mobile communication network. For example as shown in FIGS. 13 and 14, E-MBMS GW 602 may comprise a mapping of tracking area identifiers to service area identifiers. Accordingly, MH-GW 701 transmits 1303 a resolution request message comprising the macro cell layer information to E-MBMS GW 602 in order to request the translation of this information into one or more service area identifiers.

In response to a resolution request, E-MBMS GW 602 may provide 1304 one or more corresponding service area identifiers to the requesting MH-GW 701. Generally, it may be assumed that a specific macro cell or tracking area can belong to one or more service areas, e.g. considering overlapping service areas of different multicast or broadcast services. As a result, even if the network can resolve a service area identifier corresponding to macro cell layer information, it should be checked whether a respective identifier service area identifier is valid for a particular service or not.

eBM-SC 601 may serve as a typically example for an entity comprising the necessary information on the service-level configuration. Therefore, MH-GW 701 receiving 1305 a resolution response message containing one or more service area identifier(s) may request 1305 authorization of service delivery from eBM-SC 601 by sending an authorization request message to eBM-SC 601. Beside the received service area identifier(s), MH-GW 701 may include a service identifier identifying the service as requested by Home eNodeB 607 to this authorization request message. eBM-SC 601 may easily check stored service configuration corresponding to the service identifier whether one of the indicated service area identifiers is comprised or not.

In case eBM-SC 601 can confirm that the service area identifier is configured for the requested service, it can conclude that Home eNodeB 607 is also located inside the service area based on the fact that Home eNodeB 607 is located in the macro layer area, which is located in the service area. Therefore, eBM-SC 601 may acknowledge 904 the authorization request, which triggers delivery 808 of session control signaling and service data 810, 811, 812 to Home eNodeB 607 and the UEs in its femto cell.

As shown in FIG. 14, if either no service area identifier can be resolved by E-MBMS GW 602 or if eBM-SC 601 detects that none of the resolved service identifiers is corresponding to the requested service, it is concluded that Home eNodeB 607 is located outside of the service area of the requested service. In this case, service delivery to Home eNodeB 607 is rejected 1001 by eBM-SC 601 as explained previously with respect to FIG. 10. Accordingly, if UE 606 receives a service rejection from Home eNodeB 607 it may request 1004 unicast delivery of the service, as already described above.

Figure 15:
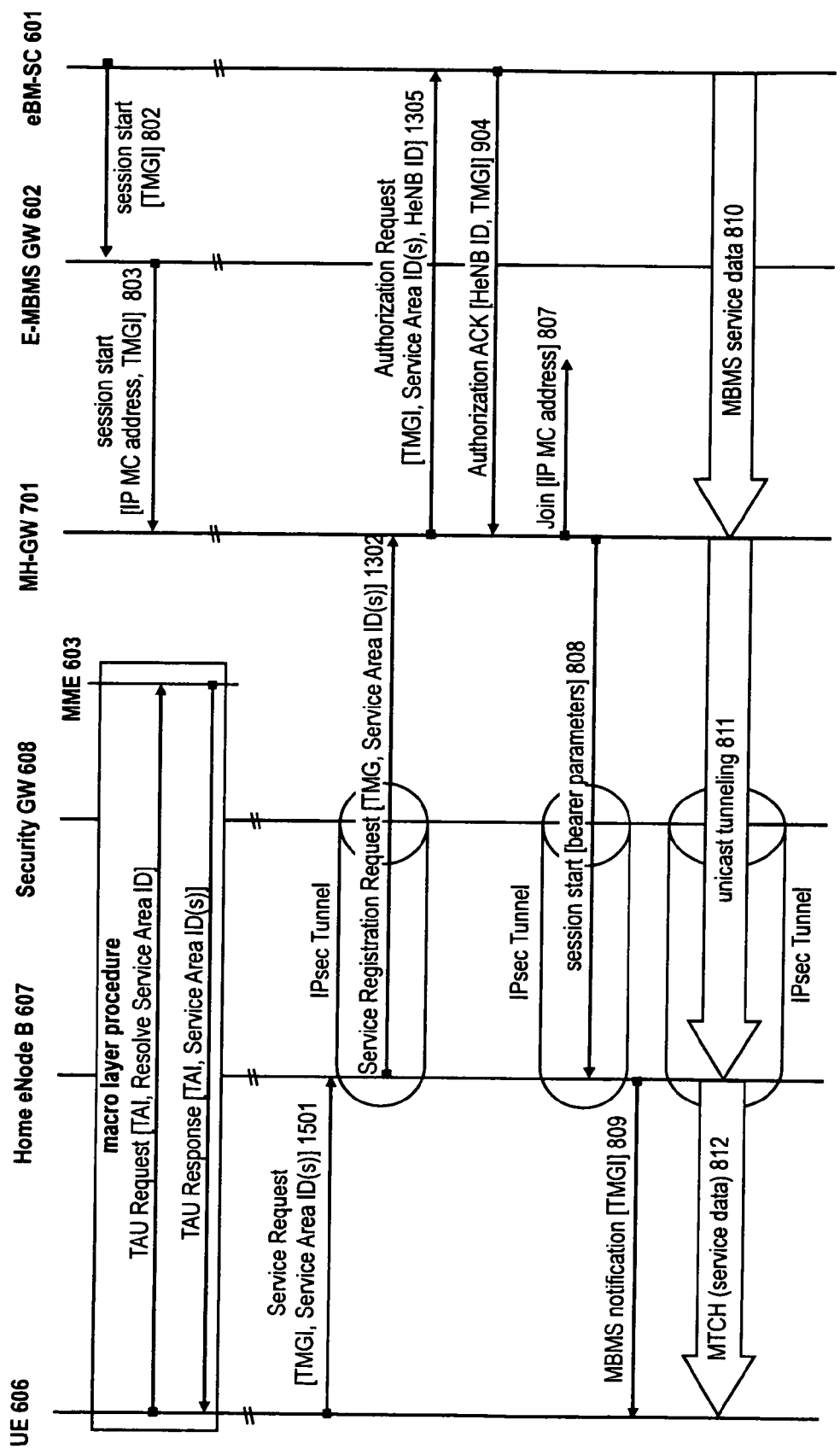
FIGS. 15 & 16 show another exemplary signaling flow for setting up an MBMS service in a femto cell controlled by a home base station (Home eNodeB 607) according to one exemplary embodiment of the invention, including a decision on the delivery mechanism for the service data based on macro cell layer location information on the home base station provided by a mobile terminal.
Figure 16:
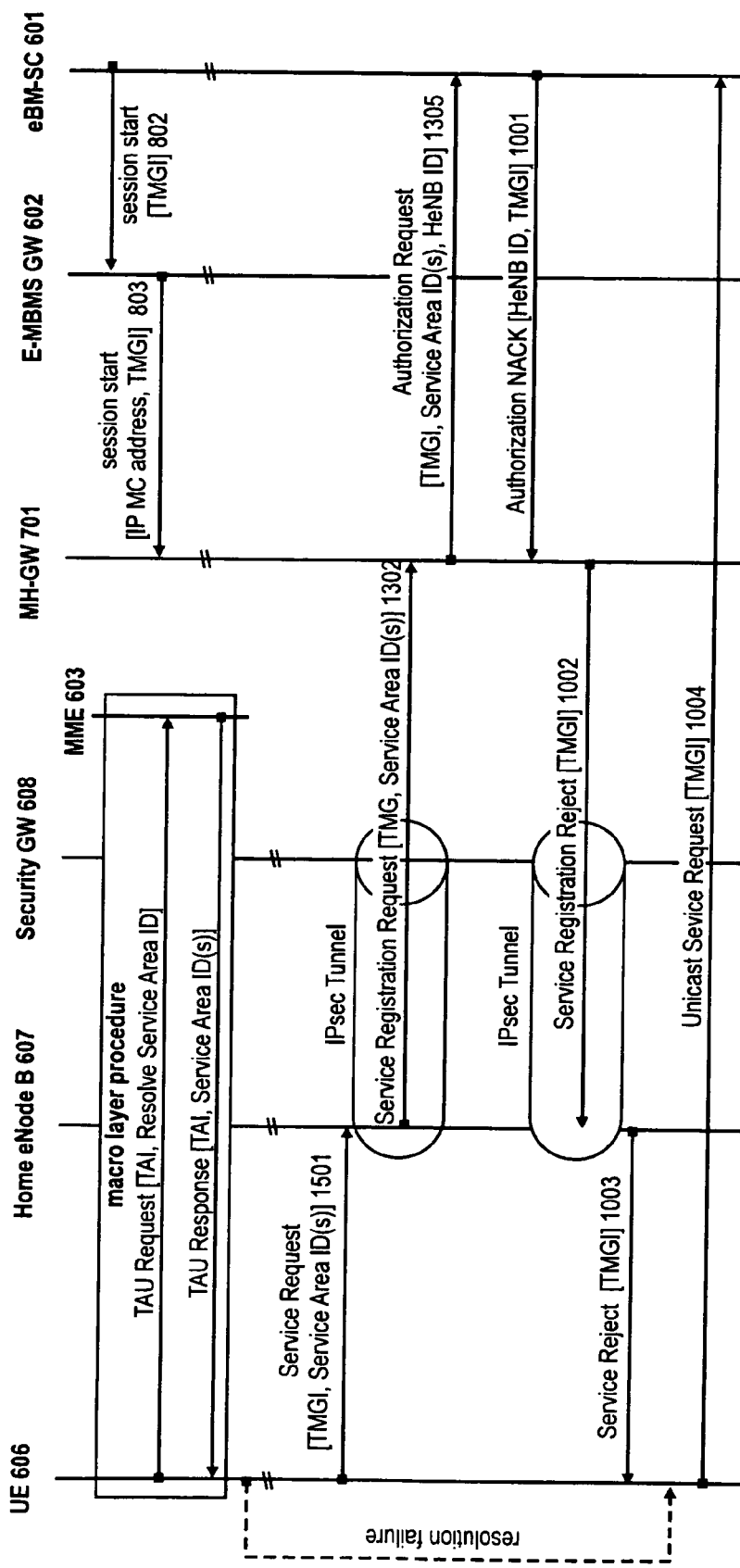

In the procedure described above the network resolves service area identifiers based on macro cell layer information obtained by an UE 606 located in a femto cell. The macro cell layer information may be detected during a measurement procedure and reported to the home base station by the mobile terminal. Another option may be that the mobile terminal actively request resolution of applicable service areas from the macro cell layer, as exemplified in FIG. 15 and FIG. 16. FIG. 15 and FIG. 16 show another exemplary signaling flow for setting up an MBMS service in a femto cell controlled by a home base station (Home eNodeB 607) according to one exemplary embodiment of the invention, including a decision on the delivery mechanism for the service data based on macro cell layer location information on the home base station provided by a mobile terminal.

UE 606 may temporally switch from the femto cell to the macro cell (or may maintain connections to both if multi-homed) and sends 1501 an request message (TAU request) to the mobile communications network. This may in particular be possible in case the UE 606 is in an IDLE state currently not receiving or transmitting any traffic. When connected to a macro cell, UE 606 may trigger a location related procedure on the macro cell layer, e.g. a Tracking Area Update (TAU) including a request to resolve service area identifiers. In the response the mobility management entity 603 (see FIG. 6 and FIG. 7) serving UE 606 in the macro cell layer network may indicate 1502 in a response message the service area identifier(s) corresponding to the macro cell from which the request is sent. Alternatively, this macro layer procedure may be performed before UE 606 is changing from a macro cell into a femto cell. In this case it may not be required to switch again to the macro cell in order to request resolution of service area identifiers.

As before, the network may provide more than one service area identifier, in case the macro cell is part of several service areas, (which may be the case for overlapping service areas of different multicast or broadcast services). Therefore, it should be validated in the network, e.g. at eBM-SC 601, whether the service area of the desired service is included in the reported service area identifiers. UE 606 may therefore include the received service area identifier(s) in its service request message for the desired multicast or broadcast service sent 1503 to Home eNodeB 607. Similar to the previously discussed procedures, Home eNodeB 607 may register 1302 at MH-GW 701 providing the service area identifiers in addition to the service identifier of the requested service to MH-GW 701. MH-GW 701 sends 1305 an authorization request to eBM-SC 601, which may check its stored service configuration whether one of the indicated service area identifiers corresponds to the service area of the indicated service.

In case eBM-SC 601 can confirm that the service area identifier is configured for the requested service, it may acknowledge 904 the authorization request, which triggers delivery of session control signaling and service data to Home eNodeB 607 and the UEs in its femto cell. As shown in FIG. 16, if either no service area identifier can be resolved in response to the macro cell layer procedure or if eBM-SC 601 detects that the resolved service identifiers are not corresponding to the requested service, it is clear that Home eNodeB 607 is located outside of the service area of the requested service. In such a case service delivery to Home eNodeB 607 is rejected 1001, 1002, 1003 in the network, which may trigger UE 606 to send 1004 a request for unicast delivery of the service like described before.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive

The invention claimed is:

1. A method for distributing control signaling for session control of a multicast or broadcast service within a mobile communication network, the method comprising:
   receiving at a base station a service request for the multicast or broadcast service from a mobile terminal, wherein the base station is associated to a tracking area of the mobile communication network;
   triggering, in response to a service request of a mobile terminal, the distribution of control signaling for session control to at least one base station of the tracking area including the base station receiving the service request; and
   maintaining, at a gateway connecting a core network of the mobile communication network to a service network in which a source of the multicast or broadcast service is located, a list of mobility management entities registered at the gateway for the multicast or broadcast service.

2. The method according to claim 1, wherein the service request is transmitted by the mobile terminal based on a session announcement for the multicast or broadcast service available to the mobile terminal.

3. The method according to claim 1, further comprising:
   transmitting a service request from the base station receiving the service request to a mobility management entity in the core network of the mobile communication system,
   in response to the service request, the mobility management entity registering for the multicast or broadcast service at the gateway.

4. The method according to claim 1, wherein the mobile communication network comprises one or more tracking areas in which the multicast or broadcast service is to be provided independent from user request or presence, and the method further comprises distributing the control signaling for session control to all base stations in the one or more tracking areas in which the multicast or broadcast service is to be provided independent from user request or presence.

5. The method according to claim 4, wherein the gateway addresses the control signaling for session control to all base stations in the one or more tracking areas in which the multicast or broadcast service is to be provided independent from user request or presence.

6. The method according to claim 1, wherein the control signaling for session control of the multicast or broadcast service comprises a session start message, and the method further comprises transmitting by the base station having received the session start message, a join message to an upstream router of the core network to join the multicast distribution tree of the multicast or broadcast service, and
   wherein the method is further comprising transmitting, by the base station having received the session start message, a notification on a multicast or broadcast service related control channel within its radio cell, wherein the notification indicates a radio resource on the downlink on which the multicast or broadcast service is provided.

7. The method according claim 1, further comprising a mobility management entity that forwards control signaling for session control of the multicast or broadcast service received from the gateway to the base station having received the service request or to all base stations of the tracking area.

8. The method according to claim 1, wherein the service request indicates the at least one tracking area the mobile terminal is registered, and wherein the service request transmitted by the base station indicates said at least one tracking area to the mobility management entity.

9. The method according to claim 1, wherein the mobility management entity forwards control signaling for session control of the multi cast or broadcast service received from the gateway to all base stations of those tracking areas the mobile terminal is registered.

10. The method according to claim 1, wherein the service request identifies the multicast or broadcast service it is transmitted for by means of an identifier and comprises an indication of the at least one tracking area the mobile terminal is registered.

11. The method according to claim 10, wherein the service request comprises an identifier of the mobile terminal and/or the base station.

12. A method for distributing control signaling for session control of a multicast or broadcast service within a mobile communication network, the method comprising:

receiving at a base station a service request for the multicast or broadcast service from a mobile terminal, wherein the base station is associated to a tracking area of the mobile communication network;

triggering, in response to the service request of the mobile terminal, the distribution of control signaling for session control to at least one base station of the tracking area including the base station receiving the service request;

receiving at a mobility management entity, in response to the mobility management entity's registration at a gateway, a message indicating that the multicast or broadcast service for which the registration has been sent by the mobility management entity has not been started yet; and informing by the mobility management entity the base station from which the service request has been received or all base stations of the tracking area on the multicast or broadcast service not having been started yet.

13. The method according to claim 12, further comprising a respective base station being informed on the multicast or broadcast service not having been started yet sending a notification in its radio cell indicating that the multicast or broadcast service has not been started yet, wherein the notification of the base station is transmitted for a predetermined period of time.

* * * * *